(12) United States Patent
Park et al.

(10) Patent No.: US 11,832,302 B2
(45) Date of Patent: Nov. 28, 2023

(54) DEVICE AND METHOD FOR SHARING BAND IN WIRELESS COMMUNICATION SYSTEM

(71) Applicants: Samsung Electronics Co., Ltd, Suwon-si (KR); Korea University Research and Business Foundation, Seoul (KR)

(72) Inventors: Seung-Hoon Park, Suwon-si (KR); Chung Gu Kang, Seoul (KR); Chung Kee Kim, Seoul (KR); Jung-Min Moon, Suwon-si (KR); Junman Lee, Seoul (KR); Byounghoon Jung, Suwon-si (KR); Jungsoo Jung, Suwon-si (KR)

(73) Assignees: Samsung Electronics Co., Ltd., Suwon-si (KR); Korea University Research & Business Foundation, Seoul (KR)

( * ) Notice: Subject to any disclaimer, the term of this patent is extended or adjusted under 35 U.S.C. 154(b) by 421 days.

(21) Appl. No.: 16/641,993

(22) PCT Filed: Aug. 23, 2018

(86) PCT No.: PCT/KR2018/009731
§ 371 (c)(1),
(2) Date: Feb. 25, 2020

(87) PCT Pub. No.: WO2019/039886
PCT Pub. Date: Feb. 28, 2019

(65) Prior Publication Data
US 2020/0359415 A1 Nov. 12, 2020

(30) Foreign Application Priority Data
Aug. 25, 2017 (KR) .................. 10-2017-0107824

(51) Int. Cl.
*H04W 74/08* (2009.01)
*H04W 16/14* (2009.01)
(Continued)

(52) U.S. Cl.
CPC ....... *H04W 74/0808* (2013.01); *H04W 16/14* (2013.01); *H04W 72/0446* (2013.01); *H04W 72/56* (2023.01)

(58) Field of Classification Search
CPC ............ H04W 74/0808; H04W 16/14; H04W 72/0446; H04W 72/10
See application file for complete search history.

(56) References Cited

U.S. PATENT DOCUMENTS 8,238,287 B1 * 8/2012 Gopi .................. H04L 41/0816
370/401
10,499,426 B2 12/2019 Oh et al.
(Continued)

FOREIGN PATENT DOCUMENTS

KR 10-2016-0066023 A 6/2016
KR 10-2016-0121447 A 10/2016
(Continued)

OTHER PUBLICATIONS

Notice of Preliminary Rejection dated Jul. 21, 2021 in connection with Korean Patent Application No. 10-2017-0107824, 15 pages.
(Continued)

*Primary Examiner* — Michael Thier
*Assistant Examiner* — Nevena Zecevic Sandhu

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An apparatus of a base station of a first operator in a wireless communication system includes: at least one transceiver;
(Continued)

and at least one processor operatively coupled with the at least one transceiver, and the at least one processor is configured to transmit a first signal during a first slot regarding the first operator in a contention duration, and to determine occupancy of a band in an access duration, based on a priority of the first operator, and the priority is determined according to at least one second signal which is detected before the first slot in the contention duration.

14 Claims, 24 Drawing Sheets

(51) Int. Cl.
*H04W 72/0446* (2023.01)
*H04W 72/56* (2023.01)

(56) References Cited

U.S. PATENT DOCUMENTS

| | | | | |
|---|---|---|---|---|
| 2008/0002734 | A1* | 1/2008 | Zheng | H04B 7/2606 |
| | | | | 370/445 |
| 2011/0176500 | A1* | 7/2011 | Wager | H04W 74/004 |
| | | | | 370/329 |
| 2014/0153505 | A1* | 6/2014 | Pantelidou | H04W 28/065 |
| | | | | 370/329 |
| 2015/0098397 | A1 | 4/2015 | Damnjanovic et al. | |
| 2015/0327222 | A1* | 11/2015 | Dahlman | H04L 5/0051 |
| | | | | 455/450 |
| 2015/0334744 | A1 | 11/2015 | Ji et al. | |
| 2016/0007380 | A1* | 1/2016 | Ito | H04W 74/0816 |
| | | | | 370/329 |
| 2017/0245185 | A1* | 8/2017 | Chuberre | H04B 7/15507 |
| 2017/0265166 | A1* | 9/2017 | Hosseini | H04W 72/30 |
| 2017/0303309 | A1* | 10/2017 | Ryu | H04W 74/004 |
| 2018/0124611 | A1 | 5/2018 | Moon et al. | |
| 2018/0317256 | A1 | 11/2018 | Um et al. | |

FOREIGN PATENT DOCUMENTS

| | | |
|---|---|---|
| KR | 10-2017-0050960 A | 5/2017 |
| KR | 10-2017-0060775 A | 6/2017 |
| KR | 10-2017-0093073 A | 8/2017 |
| KR | 10-2017-0093371 A | 8/2017 |

OTHER PUBLICATIONS

Notice of Patent Grant dated Jan. 3, 2022, in connection with Korean Application No. 10-2017-0107824, 4 pages.
"3rd Generation Partnership Project; Technical Specification Group Radio Access Network; Evolved Universal Terrestrial Radio Access (E-UTRA); Multiplexing and channel coding (Release 16)", 3GPP TS 36.212 V16.0.0 (Dec. 2019), 250 pages.
International Search Report dated Nov. 30, 2018 in connection with International Patent Application No. PCT/KR2018/009731, 2 pages.
Written Opinion of the International Searching Authority dated Nov. 30, 2018 in connection with International Patent Application No. PCT/KR2018/009731, 9 pages.

* cited by examiner

US 11,832,302 B2

DEVICE AND METHOD FOR SHARING BAND IN WIRELESS COMMUNICATION SYSTEM

CROSS-REFERENCE TO RELATED APPLICATIONS

This application is a 371 of International Application No. PCT/KR2018/009731 filed on Aug. 23, 2018, which claims priority to Korean Patent Application No. 10-2017-0107824 filed on Aug. 25, 2017, the disclosures of which are herein incorporated by reference in their entirety.

BACKGROUND

1. Field

The present disclosure generally relates to a wireless communication system, and more particularly, to an apparatus and a method for sharing a band in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In recent years, methods for a plurality of operators to share a single band, rather than for a specific operator to share a fixed band, are proposed. To share a band, a protocol that considers fairness between operators, resource efficiency, various performances of operators, a load, a cost, or the like is required.

SUMMARY

Based on the above-described discussion, the present disclosure provides an apparatus and a method for sharing a band in a wireless communication system.

In addition, the present disclosure provides an apparatus and a method for sharing a band by considering various performances between operators in a wireless communication system.

In addition, the present disclosure provides an apparatus and a method for resolving a contention between operators in a wireless communication system.

In addition, the present disclosure provides an apparatus and a method for maximizing resource utilization efficiency in a wireless communication system.

In addition, the present disclosure provides an apparatus and a method for reducing an overhead caused by a contention in a wireless communication system.

In addition, the present disclosure provides an apparatus and a method for sharing a band, reflecting performance dynamics of operators sharing the band in a wireless communication system.

Various embodiments of the present disclosure provide an apparatus of a base station of a first operator in a wireless communication system, the apparatus including: at least one transceiver; and at least one processor operatively coupled with the at least one transceiver, wherein the at least one processor is configured to transmit a first signal during a first slot regarding the first operator in a contention duration, and to determine occupancy of a band in an access duration, based on a priority of the first operator, wherein the priority is determined according to at least one second signal which is detected before the first slot in the contention duration.

Various embodiments of the present disclosure provide an apparatus of a terminal in a wireless communication system, the apparatus including: at least one transceiver; and at least one processor operatively coupled with the at least one transceiver, wherein the at least one transceiver is configured to: receive a first signal from a base station of a first operator in a contention duration; and, when receiving a start signal transmitted from the base station in an access duration, communicate with the base station through a band, wherein the start signal is transmitted based on a priority of the first operator among at least one operator sharing the band.

Various embodiments of the present disclosure provide an apparatus of a manager device in a wireless communication system, the apparatus including: at least one transceiver; and at least one processor operatively coupled with the at least one transceiver, wherein the at least one transceiver is configured to: receive sharing assisted information for sharing a band from a plurality of base stations of a plurality of operators; and transmit contention configuration information of the plurality of operators to the plurality of base stations, respectively, based on the sharing assisted information, wherein the contention configuration information includes a resource occupancy rate regarding the band, wherein the resource occupancy rate is used to determine a contention range of each operator in a contention duration.

Various embodiments of the present disclosure provide a method of a base station of a first operator in a wireless communication system, the method including: transmitting a first signal during a first slot regarding the first operator in a contention duration; and determining occupancy of a band in an access duration, based on a priority of the first operator, wherein the priority is determined according to at least one second signal which is detected before the first slot in the contention duration.

Various embodiments of the present disclosure provide a method of a terminal in a wireless communication system, the method including: receiving a first signal from a base station of a first operator in a contention duration; and, when receiving a start signal transmitted from the base station in an access duration, communicating with the base station through a band, wherein the start signal is transmitted based on a priority of the first operator among at least one operator sharing the band.

Various embodiments of the present disclosure provide a method of a manager device in a wireless communication system, the method including: receiving sharing assisted information for sharing a band from a plurality of base stations of a plurality of operators; and transmitting contention configuration information of the plurality of operators to the plurality of base stations, respectively, based on the sharing assisted information, wherein the contention configuration information includes a resource occupancy rate regarding the band, wherein the resource occupancy rate is used to determine a contention range of each operator in a contention duration.

The apparatus and the method according to various embodiments of the present disclosure can reduce an overhead caused by a contention and can increase resource utilization efficiency by sharing a band between operators.

The effects that can be achieved by the present disclosure are not limited to those mentioned in the above, and other effects that are not mentioned herein could be clearly understood by a person skilled in the art based on the following descriptions.

DETAILED DESCRIPTION

Terms used in the present disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way; unless expressly so defined herein in the present disclosure. In some cases, even if the terms are terms which are defined in the specification, they should not be interpreted as excluding embodiments of the present disclosure.

In various embodiments of the present disclosure described below, hardware-wise approach methods will be described by way of an example. However, various embodiments of the present disclosure include technology using both hardware and software, and thus do not exclude software-based approach methods.

The present disclosure relates to an apparatus and a method for sharing a band between operators in a wireless communication system. Specifically, the present disclosure describes technology for sharing a band by one or more operators by occupying an access duration through a contention duration in a frame in a wireless communication system.

As used herein, terms indicating a resource period (for example, a subframe, a frame, a control period, an update period), terms indicating signaling (for example, a signal, information, a message), terms indicating network entities (for example, a node, a manager device), terms indicating an element of a device are merely examples for convenience of explanation. Accordingly, the present disclosure is not limited to the terms described below, and other terms having the same technical meanings may be used.

In addition, the present disclosure describes various embodiments by using terms used in some communication standards (for example, $3^{rd}$ generation partnership project (3GPP)), but this is merely for explanation. Various embodiments of the present disclosure may be easily modified and applied to other communication systems.

Figure 1:
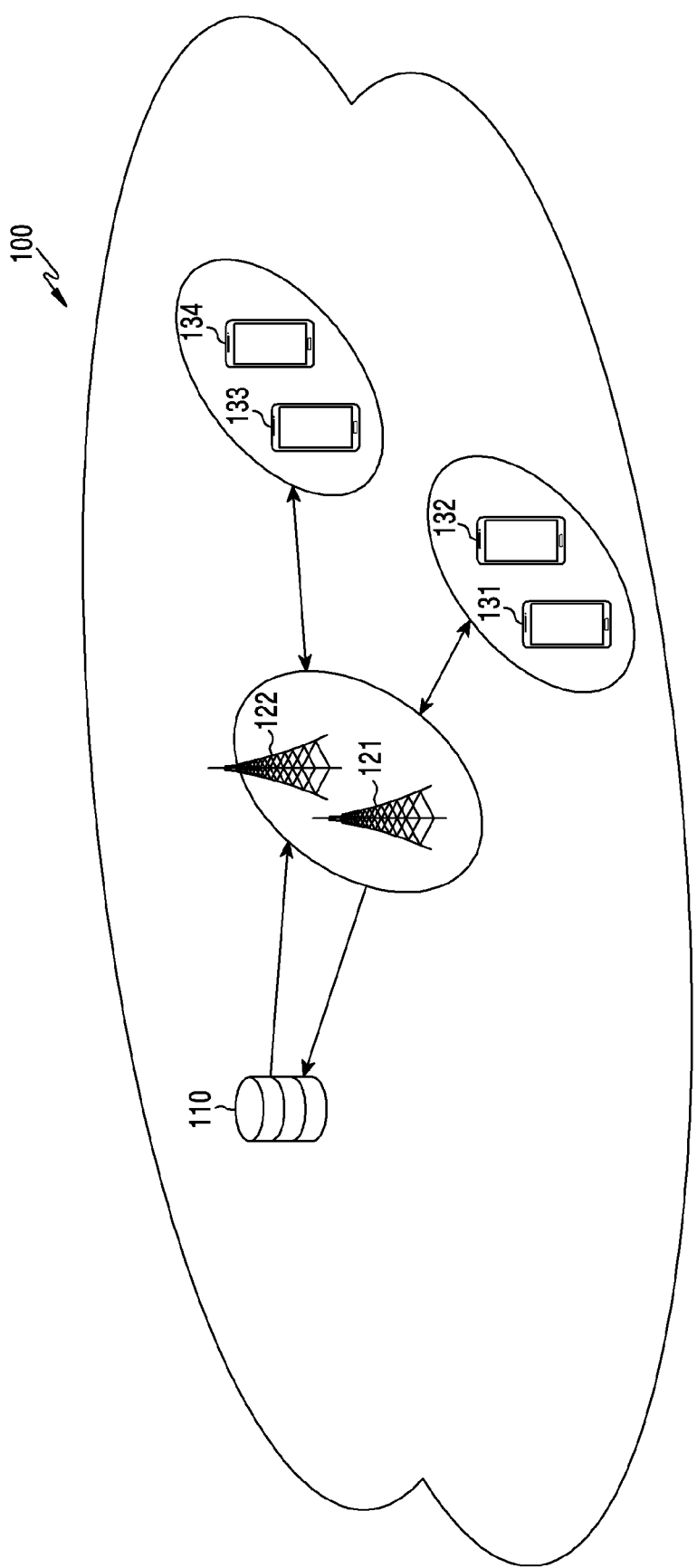
FIG. 1 is a view illustrating a wireless communication system according to various embodiments of the present disclosure.

FIG. 1 is a view illustrating a wireless communication system according to various embodiments of the present disclosure. In the following description, the wireless communication system supports a band which is shared by a plurality of operators. In other words, the present disclosure describes not a scenario in which each operator occupies a band fixedly allocated thereto, but a scenario in which a plurality of operators adaptively share one band. For example, the band may be a band (for example, 2.3 GHz to 2.4 GHz) for a spectrum access system (SAS) or a licensed shared access (LSA). In another example, the band may be a band that is shared through mutual rending between operators. In still another example, the band may be an unlicensed band, such as wireless fidelity (WiFi), Bluetooth, licensed assisted access (LAA), industrial scientific medical (ISM) bands.

Referring to FIG. 1, as some of nodes using wireless channels in a wireless communication environment 100, a manager device 110, a first base station 121, a second base station 122, a first terminal 131, a second terminal 132, a third terminal 133, and a fourth terminal 134 are illustrated.

The manager device 110 may be a device which provides necessary information for sharing a spectrum (or sharing a band) between operators. The manager device 110 may be referred to as a spectrum manager (SM). Herein, the operator refers an entity which provides or manages a communication service. The operator may be referred to as a mobile network operator, a wireless service provider, a service manager, or a cellular company. In some embodiments, the operator may include a mobile virtual network operator.

The manager device 110 may determine parameters for sharing a band between operators. The manager device 110 may acquire information for a contention in a band from operators. The manager device 110 may collect information required through a base station of each operator, or may provide determined information to each operator. For example, the manager device 110 may provide information related to band sharing, such as a load of each operator, an access probability, a resource occupancy rate, duration allocation information, a performance matric, or the like, to each provider.

The first base station 121 or the second base station 122 is a network infrastructure for providing a wireless access to terminals within a coverage. The first base station 121 may be a base station which is managed by a first operator. The second base station 122 may be a base station which is managed by a second operator. A coverage supported by each operator is determined according to a network of each operator. The coverage may be defined as a certain geographical region based on a distance within which the first station 121 or the second base station 122 transmits a signal. The first base station 121 may provide a service to terminals subscribing to the service of the first operator. The second base station 122 may provide a service to terminals subscribing to the service of the second operator. The first base station 121 or the second base station 122 may be referred to as an "access point (AP)," an "eNodeB (eNB)," a $5^{th}$ generation node (5G node)", a "5G nodeB (NB)," "a wireless point," a "transmission/reception point (TRP)", a "distributed unit (DU)," a "radio unit (RU)," a "remote radio head (RRH)," or other terms having the same technical meaning as those of the above-mentioned terms, in addition to the base station. In the present disclosure, a base station will be described as an example of a device which performs a role and a function of an operator, but the present disclosure is not limited thereto. Operations for an operator according to various embodiments may be performed not only by the base station managed by the operator, but also by a device of an upper node.

The first terminal 131, the second terminal 132, the third terminal 133, and the fourth terminal 134 are devices which are used by users, and communicate with a base station of a corresponding operator through a wireless channel. The first terminal 131 and the second terminal 132 are terminals subscribing to the service of the first operator, and may communicate with the first base station 121 through a wireless channel. The third terminal 133 and the fourth terminal 134 are terminals subscribing to the service of the second operator, and may communicate with the second base station 122 through a wireless channel. The wireless channel may be a channel within a band that is shared between the first operator and the second operator. In some cases, at least one of the first terminal 131, the second terminal 132, the third terminal 133, and the fourth terminal 134 may be managed without involvement by the user. For example, the fourth terminal 134 may be a device performing machine type communication (MTC), and may not be carried by the user. Each of the first terminal 131, the second terminal 132, the third terminal 133, and the fourth terminal 133 may be referred to as "user equipment (UE)," a "mobile station," a "subscriber station," a "remote terminal," a "wireless terminal," an "electronic device," or a "user device," or other terms having the same technical meaning as those of the above-mentioned terms, in addition to the terminal. The terminal (for example, the first terminal 131, the second terminal 132, the third terminal 133, and the fourth terminal 134) according to various embodiments may include at least one of, for example, a smart phone, a tablet personal computer (PC), a mobile phone, a video phone, an electronic book reader device, a desk top PC, a laptop PC, a netbook computer, a workstation, a server, a personal digital assistant (PDA), a portable multimedia player (PMP), an MP3 player, a medical device, a camera, or a wearable device.

In the present disclosure, the manager device 110 is a device separate from the base station, but the present disclosure is not limited thereto. That is, the manager device 110 may be positioned within a base station managed by an operator. The manager device 110 may be positioned in a base station of a specific operator, and may perform signaling to transmit and receive information to and from a base station (or an upper network node) of another operator.

Figure 2:
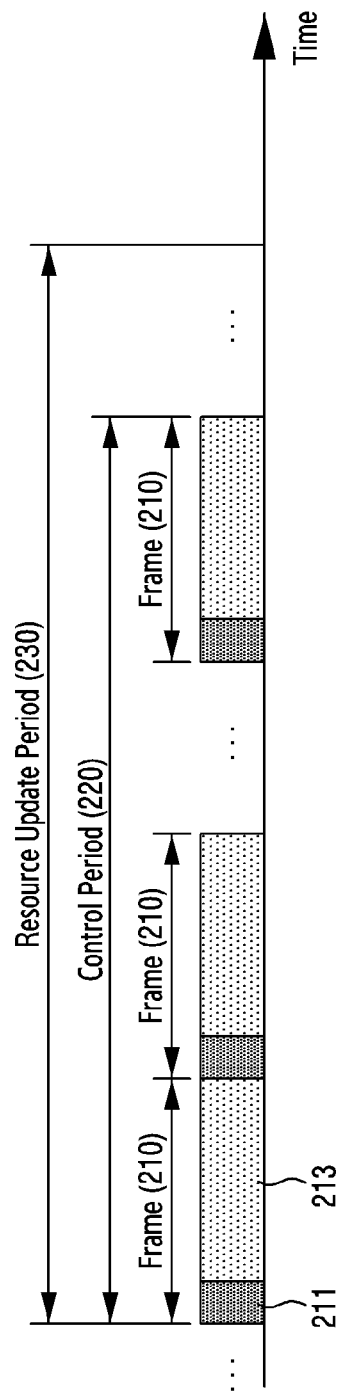
FIG. 2 is a view illustrating an example of a frame structure in a wireless communication system according to various embodiments of the present disclosure.

FIG. 2 is a view illustrating an example of a frame structure in a wireless communication system according to various embodiments of the present disclosure. The frame structure may be a resource structure for sharing a band between operators. Hereinafter, a hierarchical resource structure, that is, hierarchical resource periods, on a time domain, will be described through FIG. 2.

Referring to FIG. 2, each resource period may have its unit expanded in order of a frame 20, a control period 220, and an update period 230.

The frame 210 may be a unit for resolving traffic of an operator. The frame 210 may include a contention duration 211 and an access duration 213. The contention duration 211 is a duration for informing a priority of each operator. As the priority between operators is determined through the contention duration 211, contention resolution may be performed. The access duration 213 is a duration in which an operator occupies a band, based on the priority determined in the contention duration 211. In other words, the access duration 213 may be a duration for transmitting traffic through a band, according to the priority determined in the contention duration 211. Durations in the access duration 213 are occupied in sequence from an operator having the highest priority. In some embodiments, the contention duration 211 may be set to a multiple of a unit (for example, a sub frame) forming the frame 210.

In some embodiments, the frame 210 may correspond to a specific resource structure in a related-art communication system. For example, the frame 210 may be a radio frame of an LTE communication system. In another example, the frame 210 may be a sub frame of the LTE system.

The control period 220 may be a unit for balancing between operators to occupy a band. The control period 220 may be referred to as a system duration, a configuration frame, or a configuration duration. The control period 220 may include a plurality of frames (for example, frames 210). Parameters configured in the control period 220 may be determined from matrics for managing a longer-term characteristic than that of the frame 210 and a shorter-term characteristic than that of the update period 23, which will be described below. For example, an access parameter configured in the control period 220 may be determined based on an access probability or a resource occupancy rate during a previous period of each operator.

In some embodiments, the control period 220 may correspond to a specific resource structure in a related-art communication system. For example, the control period 220 may correspond to a system frame. In another example, the control period 220 may be a radio frame of an LTE communication system.

The update period 230 may be a unit for updating the resource structure. In other words, the update period 230 may be a unit for adjusting a length of at least one of the contention duration 211, the access duration 213, the frame 210, or the control period 220, which is a subordinate structure. The update period 230 may include a plurality of control periods. The plurality of control periods may include the control period 220. A resource structure in the update period 230 may be determined from metrics for managing a longer-term characteristic than that of the control period 220. For example, the contention duration (e.g., frame 210) in the update period may be allocated based on the number of operators or performance metrics (for example, a cost, traffic requirements, system requirement performance, a network characteristic of each operator).

In some embodiments, the update period 230 may correspond to a specific resource structure in a related-art communication system. For example, the update period 230 may correspond to a hyper frame. In another example, the update period 230 may correspond to a system frame.

The hierarchical frame structure illustrated in FIG. 2 is merely an example. Operations described below are not limited by descriptions of the name of each unit, an exemplary length, the number of layers of the hierarchical structure, or the like. For example, a resource period which is an upper structure of the update period may be used to share a band in the present disclosure. In addition, for example, an access probability of each operator may be reset in every update period, rather than the control period.

Hereinafter, a functional configuration of each of the devices for a band sharing protocol according to various embodiments of the present disclosure will be described with reference to FIGS. 3 to 5.

Figure 3:
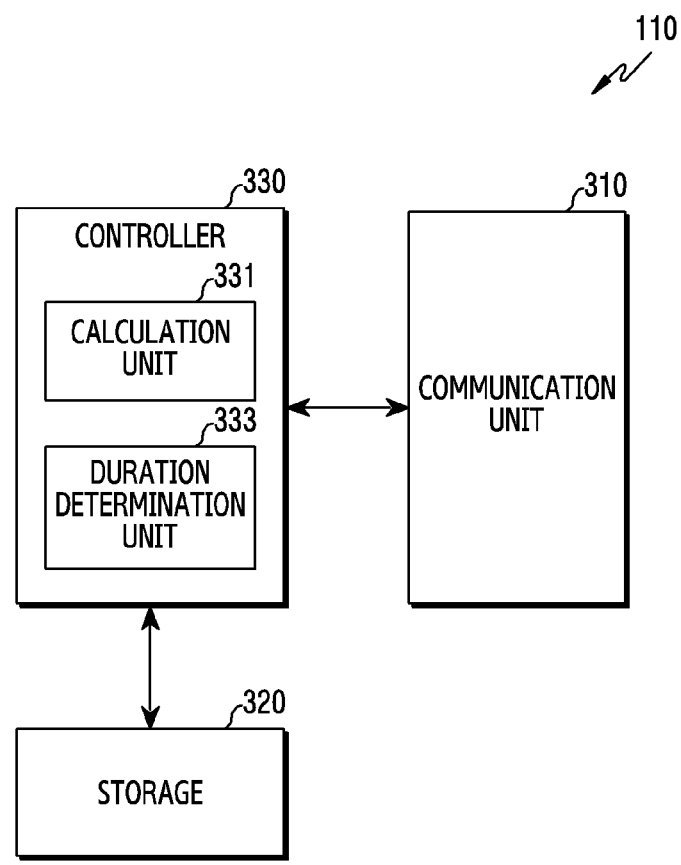
FIG. 3 is a view illustrating a configuration of a manager device in a wireless communication system according to various embodiments of the present disclosure.

FIG. 3 is a view illustrating a configuration of a manager device in a wireless communication system according to various embodiments of the present disclosure. The configuration illustrated in FIG. 3 may be understood as a configuration of the manager device 110. The term "unit" or terms ending with suffixes "-er," and "-or" used in the following description refer to a unit processing at least one function or operation, and may be implemented by hardware, software, or a combination of hardware and software.

Referring to FIG. 3, the manager device includes a communication unit 310, a storage 320, and a controller 330.

The communication unit 310 may perform functions for transmitting and receiving information. Specifically, the communication unit 310 may provide an interface for communicating with other nodes in a network. That is, the communication unit 310 may convert a bit stream to be transmitted from the manager device to another node, for example, a base station (for example, the first base station 121, the second base station 122) into a physical signal, and may convert a physical signal received from a base station to a bit stream.

The communication unit 310 may perform functions for transmitting and receiving signals in a wired communication environment. The communication unit 310 may include a wired interface for controlling a direction connection between devices through a transmission medium (for example, a copper wire, an optical fiber). For example, the communication unit 310 may transmit an electric signal to another device through a copper wire, or may convert between an electric signal and an optical signal.

The communication unit 310 may perform functions for transmitting and receiving signals in a wireless communication network. For example, the communication unit 310 may perform a conversion function between a baseband signal and a bit stream according to a physical layer standard of the system. In addition, the communication unit 310 may include a plurality of transmission and reception paths.

The communication unit 310 may transmit and receive signals as described above. Accordingly, the communication unit 310 may be referred to as a "transmitter," "receiver," or "transceiver." In addition, in the following description, transmitting and receiving may be used as a meaning including processing by the communication unit 310 as described above. According to various embodiments, the communication unit comprises one or more transceiver units.

According to various embodiments, the communication unit 310 may receive sharing assisted information from a base station managed by each operator. The sharing assisted information may include parameters which are considered for each base station to share a band, or information necessary for calculating the parameters. According to various embodiments, the communication unit 310 may provide configuration values necessary for band sharing for each operator or information regarding a resource period (for example, a length of a contention duration) to each operator.

The storage unit 320 may store data such as a basic program for the operation of the manager device, an application program, configuration information, etc. The storage 320 may be configured by a volatile memory, a nonvolatile memory, or a combination of a volatile memory and a nonvolatile memory. In addition, the storage 320 provides stored data according to a request of the controller 330. According to various embodiments, the storage 320 may store, as a repository, information for determining a parameter (for example, a contention range) for occupying a band of each operator. For example, a base station of each operator may acquire necessary information by accessing the storage 320, and may determine an access parameter through the storage 320 in a distributed manner.

The controller 330 controls overall operations of the manager device. For example, the controller 330 transmits and receives signals through the communication unit 310. In addition, the controller 330 writes and read data on and from a storage (not shown). To achieve this, the controller 330 may include at least one processor.

According to various embodiments, the controller 330 may include a calculation unit 331 for calculating parameters for occupying a band, such as an access probability of each operator, a resource occupancy rate, based on the access information, and a duration determination unit 333 for determining a resource structure such as a contention duration. The calculation unit 331 or the duration determination unit 333 may be a storage space storing an instruction/code resided in the controller 330 at least temporarily or an instruction/code, as a set of instructions or code stored in the storage 330, or may be a portion of a circuitry forming the controller 330. According to various embodiments, the controller 330 may control a subordinate manager device to perform operations according to various embodiments, which will be described below.

Figure 4:
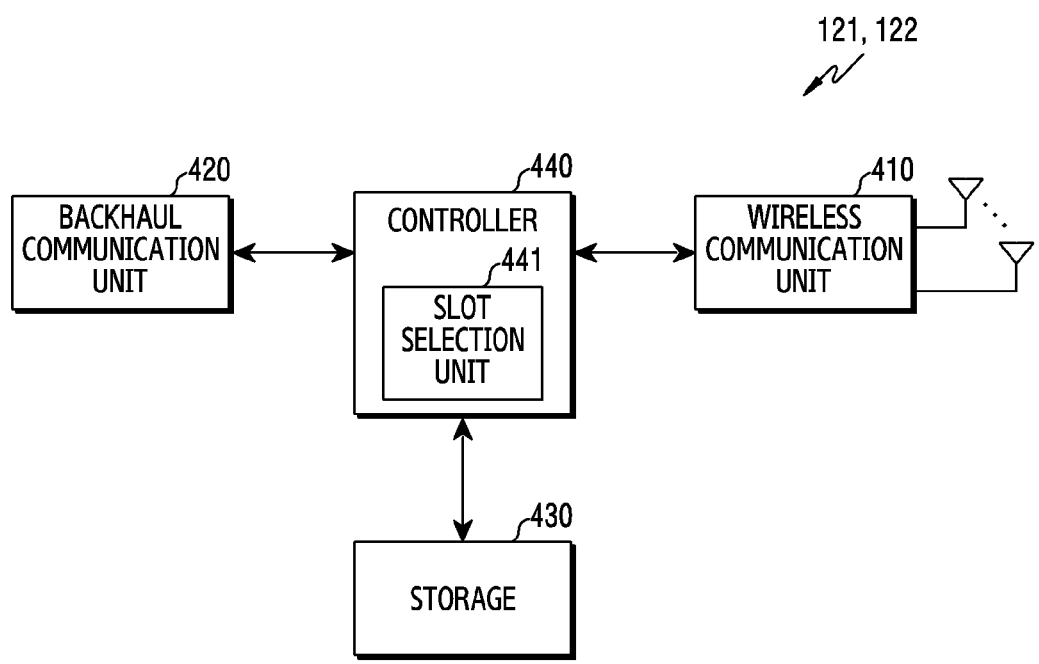
FIG. 4 is a view illustrating a configuration of a base station in a wireless communication system according to various embodiments of the present disclosure.

FIG. 4 is a view illustrating a configuration of a base station in a wireless communication system according to various embodiments of the present disclosure. The configuration illustrated in FIG. 4 may be understood as a configuration of the first base station 121 or the second base station 122. The term "unit" or terms ending with suffixes "-er," and "-or" refer to a unit processing at least one function or operation, and may be implemented by hardware, software, or a combination of hardware and software.

Referring to FIG. 4, the base station may include a wireless communication unit 410, a backhaul communication unit 420, a storage 430, and a controller 440.

The wireless communication unit 410 performs functions for transmitting and receiving signals via a wireless channel. For example, the wireless communication unit 410 may perform a function of converting between a baseband signal and a bit stream according to a physical layer standard of the system. For example, when transmitting data, the wireless communication unit 410 may generate complex symbols by encoding and modulating a transmission bit stream. In addition, when receiving data, the wireless communication unit 410 may restore a reception bit stream by demodulating and decoding a baseband signal. In addition, the wireless communication unit 410 may up-convert a baseband signal into a radio frequency (RF) band signal, and then may transmit the signal via an antenna, and may down-convert an RF band signal received via an antenna into a baseband signal.

To achieve this, the wireless communication unit 410 may include a transmission filter, a reception filter, an amplifier, a mixer, an oscillator, a digital to analog converter (DAC), an analog to digital converter (ADC), or the like. In addition, the wireless communication unit 410 may include a plurality of transmission and reception paths. Furthermore, the wireless communication unit 410 may include at least one antenna array including a plurality of antenna elements. In the hardware aspect, the wireless communication unit 410 may be configured by a digital unit and an analog unit, and the analog unit may be configured by a plurality of sub-units according to operating power, an operating frequency, or the like.

The wireless communication unit 410 may transmit and receive signals as described above. Accordingly, an entirety or a portion of the wireless communication unit 410 may be referred to as a "transmitter," "receiver," or "transceiver." In addition, in the following description, transmitting and receiving via a wireless channel may be used as a meaning including processing by the wireless communication unit 410 as described above.

The backhaul communication unit 420 provides an interface for communicating with the other nodes (for example, the manager device 110 of FIG. 1) in the network. That is, the backhaul communication unit 420 may convert a bit stream to be transmitted from the base station to another node, for example, another access node, another base station, an upper node, a core network, or the like, into a physical signal, and may convert a physical signal transmitted from another node into a bit stream The storage 430 may store data such as a basic program for the operation of the base station, an application program, configuration information, or the like. The storage 430 may be configured by a volatile memory, a nonvolatile memory, or a combination of a volatile memory and a nonvolatile memory. In addition, the storage 430 provides stored data according to a request of the controller 440.

The controller 440 controls overall operations of the base station. For example, the controller 440 may transmit and receive signals via the wireless communication unit 410 or the backhaul communication unit 420. In addition, the controller 440 may write and read out data on or from the storage 430. In addition, the controller 440 may perform functions of a protocol stack required by the communication standard. To achieve this, the controller 440 may include at least one processor. According to various embodiments, the controller 440 may include a slot selection unit 441. The slot selection unit 441 may determine (identify) a certain contention slot within a defined range in the contention duration. The controller 440 may control the wireless communication unit 410 to transmit a reservation signal in the determined contention slot. Herein, the slot selection unit 441 may be a storage space which stores an instruction/code resided in the controller 440 at least temporarily or an instruction/code, as a set of instructions or a code stored in the storage 430, or a portion of a circuitry forming the controller 440. According to various embodiments, the controller 440 may control the base station to perform operations according to various embodiments, which will be described below.

Figure 5:
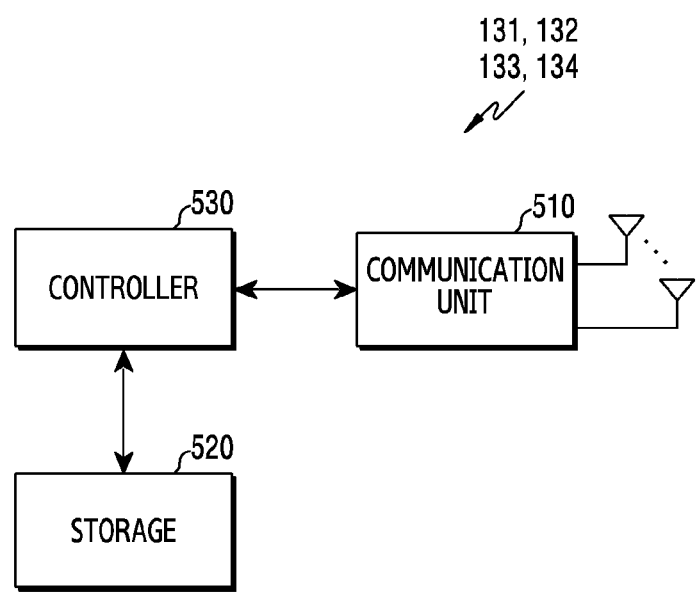
FIG. 5 is a view illustrating a configuration of user equipment in a wireless communication system according to various embodiments of the present disclosure.

FIG. 5 is a view illustrating a configuration of user equipment in a wireless communication system according to various embodiments of the present disclosure. The configuration illustrated in FIG. 5 may be understood as a configuration of the first terminal 131, the second terminal 132, the third terminal 133, or the fourth terminal 134. The term "unit" or terms ending with suffixes "-er," and "-or" used in the following description refer to a unit processing at least one function or operation, and may be implemented by hardware, software, or a combination of hardware and software.

Referring to FIG. 5, the terminal may include a communication unit 510, a storage 520, and a controller 530.

The communication unit 510 performs functions for transmitting and receiving signals via a wireless channel. For example, the communication unit 510 may perform a function of converting between a baseband signal and a bit stream according to a physical layer standard of the system. For example, when transmitting data, the communication unit 510 may generate complex symbols by encoding and modulating a transmission bit stream. In addition, when receiving data, the communication unit 510 may restore a reception bit stream by demodulating and decoding a baseband signal. In addition, the communication unit 510 may up-convert a baseband signal into an RF band signal, and then may transmit the signal via an antenna, and may down-convert an RF band signal received via an antenna into a baseband signal. For example, the communication unit 510 may include a transmission filter, a reception filter, an amplifier, a mixer, an oscillator, a DAC, an analogue-to-digital converter ADC, etc.

In addition, the communication unit 510 may include a plurality of transmission and reception paths. Furthermore, the communication unit 510 may include at least one antenna array including a plurality of antenna elements. In the hardware aspect, the communication unit 510 may be configured by a digital circuit and an analog circuit (for example, a radio frequency integrated circuit (RFIC)). Herein, the digital circuit and the analogue circuit may be implemented as a single package. In addition, the communication unit 510 may include a plurality of RF chains. Furthermore, the communication unit 510 may perform beamforming.

In addition, the communication unit 510 may include different communication modules to process signals of different frequency bands. Furthermore, the communication unit 510 may include a plurality of communication modules to support a plurality of different wireless access technologies. For example, the different wireless access technologies may include Bluetooth low energy (BLE), Wi-Fi, WiFi Gigabyte (WiGig), a cellular network (for example, long term evolution (LTE)), etc. In addition, the different frequency bands may include a super high frequency (SHF) (for example, 2.5 GHz, 5 GHz) band, a millimeter (mm) wave (for example, 38 GHz, 60 GHz, etc.) band. According to various embodiments, the communication module may include at least one sensor. A sensor mounted in the communication module may provide measurement information (or sensor information) regarding an operation for controlling directivity to a processor (for example, a communication processor (CP)) in the communication module.

The communication unit 510 may transmit and receive signals as described above. Accordingly, an entirety or a portion of the communication unit 510 may be referred to as a "transmitter," "receiver," or "transceiver." In addition, in the following description, transmitting and receiving via a wireless channel may be used as a meaning including processing by the communication unit 510 as described above.

The storage 520 may store data such as a basic program for the operation of the terminal, an application program, configuration information, etc. The storage 520 may be configured by a volatile memory, a nonvolatile memory, or a combination of a volatile memory and a nonvolatile memory. In addition, the storage 520 provides stored data according to a request of the controller 530.

The controller 530 controls overall operations of the terminal. For example, the controller 530 may transmit and receive signals via the communication unit 510. In addition, the controller 530 may write and read out data on or from the storage 520. In addition, the controller 530 may perform functions of a protocol stack required by the communication standard. To achieve this, the controller 530 may include at least one processor or micro processor, or may be a portion of a processor. In addition, a portion of the communication unit 510 and the controller 530 may be referred to as a communication processor (CP). The controller 530 may include various modules to perform communication. According to various embodiments, the controller 530 may control the terminal to perform operations according to various embodiments as will be described below.

Hereinafter, specific operations for a frame-based protocol for sharing a band between operators according to various embodiments of the present disclosure will be described with reference to FIGS. 6 and 7. In the following description, the protocol may be referred to as a frame-based band sharing protocol, a band sharing protocol, an access duration sharing protocol, or a frame sharing protocol.

Frame-Based Band Sharing Protocol

Figure 6:
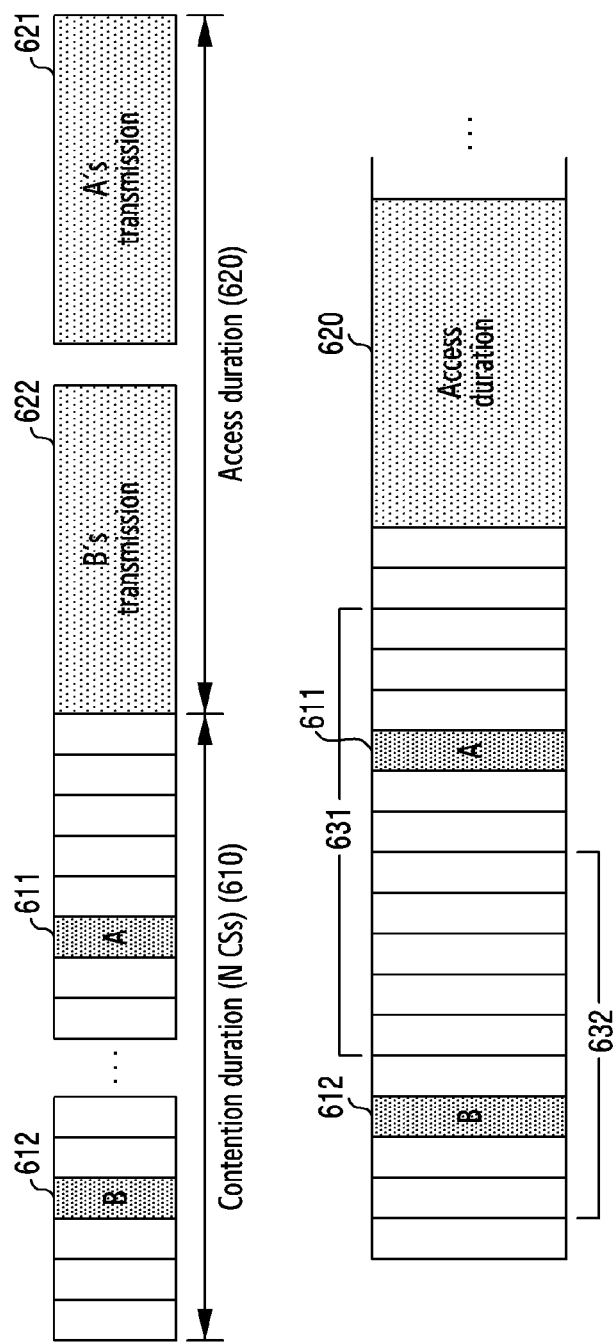
FIG. 6 is a view illustrating an example of a frame-based band sharing protocol in a wireless communication system according to various embodiments of the present disclosure.

FIG. 6 is a view illustrating an example of a frame-based band sharing protocol in a wireless communication system according to various embodiments of the present disclosure. Herein, the band may be a band to be shared by operators. In the following description, an entity performing an operation for an operator will be described as a base station, but the present disclosure is not limited thereto. Operations according to various embodiments may be performed by a certain network entity (or a network node) managed by the operator, in addition to the base station. For example, the network entity may be an upper node (for example, a mobile management entity (MME), a gateway) which is higher than the base station.

Referring to FIG. 6, a frame includes a contention duration 610 and an access duration 620. The contention duration 610 may be a duration for resolving a contention between operators. The contention duration 610 is an example of the contention duration 211 of FIG. 2. The contention duration 610 may include at least one slot. The slot included in the contention duration 610 may be referred to as a contention slot (CS). For example, the contention duration 610 may include N number of contention slots.

The access duration 620 may be a duration in which an operator accesses a band according to a priority determined in the contention duration, that is, occupies a band. The access duration 620 is an example of the access duration 213 of FIG. 2. The operator may occupy a band through wireless communication (for example, cellular communication) between a base station managed by the operator and terminals subscribing to a service of the operator.

A first operator A and a second operator B may attempt to occupy a band during a frame including the access duration 620. That is, a first base station (for example, the first base station 121) of the first operator A, and a second base station (for example, the second base station 122) of the second operator B may perform a contention procedure in the contention duration 610 to occupy a band. The first base station and the second base station may determine their own priorities for the contention duration 610. The first base station and the second base station may determine their own priorities by transmitting a signal in a contention slot. The first base station may determine to transmit a signal in a contention slot 611. The second base station may determine to transmit a signal in a contention slot 612. Herein, the signal may be referred to as a reservation signal for reserving the access duration 620 afterward. The reservation signal may be referred to as an initial signal for initiating occupancy of a channel, a dummy signal, or other names having the same technical meaning as those of the above-mentioned signals.

According to various embodiments, the contention slot allocated to each base station may be determined based on a contention range. Herein, the contention range is a range where the contention slot is positioned in the content duration, and may be referred to as a contention slot selection range. For example, the first base station of the first operator A may identify the first contention slot 611 in a first contention range 631. The second base station of the second operator B may identify the second contention slot 612 in a second contention range 632. In some embodiments, a criterion for identifying (or selecting) the contention slot in the contention range may be randomly determined. That is, the contention slot may be randomly identified. For example, the contention slots in the contention range may be uniformly distributed. A probability that each contention slot is selected is the same. In another example, the contention slots in the contention range may be normally distributed. In some other embodiments, the contention slot may be identified in the contention range according to a specified rule. For example, a probability that an early contention slot is identified according to a traffic load of the base station or a traffic size existing in a buffer may be relatively high. In another example, a probability that a late contention slot is identified according to a channel change in the base station or a frequency selectivity may be relatively high.

The second base station may transmit a reservation signal in the contention slot 612. In this case, the first base station may detect a reservation signal of another operator (for example, the reservation signal of the second base station) before its own contention slot, that is, the contention slot 611. The first base station may determine that the priority of the first operator is lower than the priority of the second operator. In this method, the base station of each operator may determine the priority of each operator by detecting a reservation signal of another operator before the contention slot of each operator in the contention duration 610. Herein, the priority may be a priority in a predetermined duration (for example, a frame) including the access duration 620. The second base station of the second operator B does not detect a reservation signal of another operator before the contention slot 612, and thus may determine that the priority of the second operator is the highest.

After the contention duration 610 ends, the base station of each operator may determine whether to occupy the access duration 620 according to the priority determined in the contention duration 610. The second base station may determine to occupy the access duration 620 at a start point of the access duration 620 since the priority of the second operator is the highest. The second base station may occupy a band for a duration 622. The duration 622 may correspond to a size of traffic to be processed by the second base station (for example, a size of data included in a buffer). The first base station may occupy a band after the occupancy of the band by the second base station ends. The first base station may occupy a band for a duration 621.

As described above, each of the base stations of the operators attempting to share a band in a defined contention duration may identify a contention slot in the contention range, and may transmit a reservation signal in the contention slot. The base station of the operator may obtain a band occupancy opportunity in the access duration by determining the priority of the operator. According to various embodiments, by configuring a contention range for each operator in the contention duration, the priority is adjusted based on a probability, and thus fairness between operators can be satisfied. In addition, by giving an occupancy opportunity to an operator with a low priority, a resource waste problem of the fixed frame structure may be reduced.

In the above-described example, the operations of the base station for the operator according to various embodiments are performed by the base station. However, the operations may be performed by another network entity of the operator. Hereinafter, operations of the base station in the contention duration and the access duration will be described with reference to FIG. 7.

Figure 7:
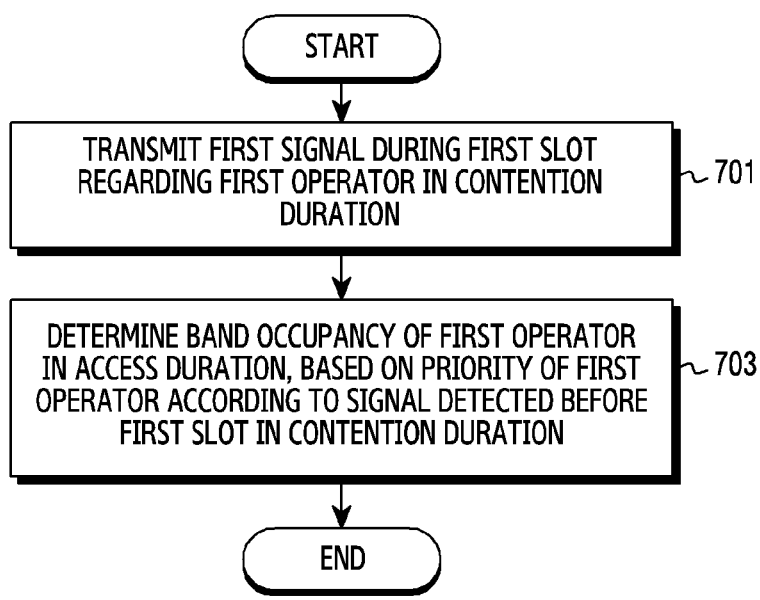
FIG. 7 is a view illustrating an operation flow of a base station for a frame-based band sharing protocol in a wireless communication system according to various embodiments of the present disclosure.

FIG. 7 is a view illustrating an operation flow of a base station for a frame-based band sharing protocol in a wireless communication system according to various embodiments of the present disclosure. In the following description, the base station may be an example of the first base station 121 or the second base station 122 of FIG. 1.

In step 701, the base station may transmit a first signal during a first slot for a first operator in a contention duration. Herein, the base station may be a base station of the first operator. The base station may identify the first slot from among the plurality of slots in the contention duration as a contention slot of the first operator. The base station may transmit a reservation signal during the first slot. According to various embodiments, the base station transmits a reservation signal during the first slot, rather than continuously transmitting the first signal from the first slot until the end of the contention duration, such that a base station of another operator may determine a priority of another operator from among operators attempting to share a band in an access duration.

In step 703, the base station may determine band occupancy of the first operator in the access duration, based on a priority of the first operator determined according to a signal detected before the first slot in the contention duration. In the same way as transmitting the first signal in order for another operator to recognize the priority in step 701, the base station may determine the priority of the first operator (that is, the operator of the base station) from among the operators attempting to share the band in the access duration.

The base station may monitor the contention duration to determine the priority of the first operator. The base station may determine (or observe) whether a signal of another operator is detected by monitoring the contention duration. The base station may determine the priority of the first operator by observing a signal of another operator before the first slot in the contention duration. For example, when signals are detected from two slots before the first slot, the base station may determine that the first operator has the third priority. Herein, each signal may be a signal performing the same function as the reservation signal in step 701.

The base station may determine band occupancy of the first operator in the access duration based on the determined priority. The priority may be a priority regarding the occupancy opportunity in the access duration. For example, when the priority of the first operator is the highest among the operators attempting to share the band in the access duration, the base station may determine to occupy the band when the access duration starts. This is because the priority of the first operator is higher than those of the other operators in the occupancy opportunity (or transmission opportunity (TXOP)). After the occupancy by the first operator, an operator having a next higher opportunity may have the occupancy opportunity. In the following description, the occupancy opportunity indicates a possibility of sharing a band in the access duration or an order for sharing a band. In another example, when there is another operator having a higher priority than the priority of the first operator, the base station of the first operator may occupy the band after the band occupancy by another operator ends. That is, the base station may occupy the band when traffic of another operator having the higher priority than that of the first operator is all resolved. Even when there is an operator having the higher priority than that of the first operator, the base station may be given the occupancy opportunity to occupy a band in the access duration, by obtaining the priority of the first operator among the operators through the contention duration. When the occupancy by the top priority level operator having the highest priority ends in the access duration, a next higher priority level operator occupies in the access duration, such that residual resources are not wasted.

With reference to FIGS. 6 and 7, the protocol for sharing the band between operators in the contention duration has been described. According to various embodiments, by giving the occupancy opportunity in the access duration of the frame to a next higher priority level operator or a higher priority level operator next thereto, in addition to the operator having the highest priority, the plurality of operators may occupy the frame at different times. That is, one operator does not always share one frame, and instead, a plurality of operators share one frame according to a situation, such that resource efficiency can be enhanced and an overhead (for example, a medium control access (MAC) overhead) which may be caused by a contention between operators can be reduced.

Hereinafter, specific operations of a network entity (for example, a base station) of each operator or a terminal to occupy a band through a frame-based band sharing protocol will be described with reference to FIGS. 8 to 10.

Band Occupancy

Figure 8:
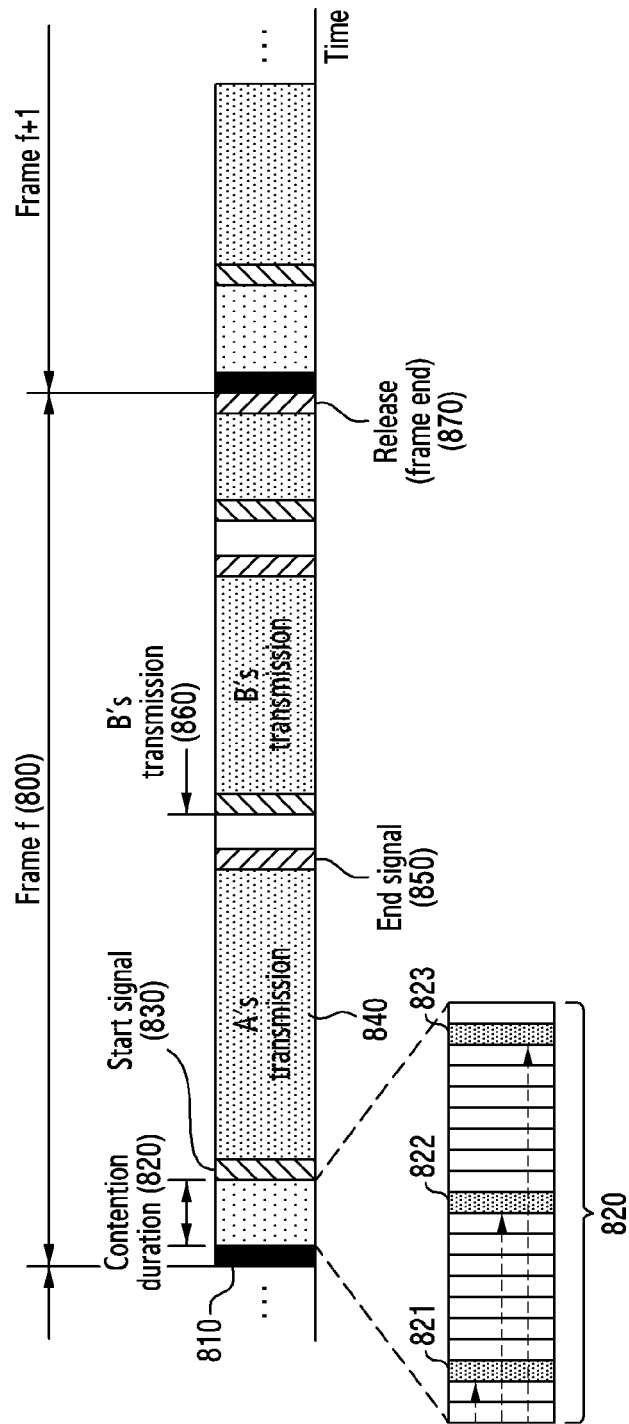
FIG. 8 is a view illustrating an example of band occupancy in a wireless communication system according to various embodiments of the present disclosure.

FIG. 8 is a view illustrating an example of band occupancy in a wireless communication system according to various embodiments of the present disclosure. With reference to FIG. 8, operations between base stations of respective operators in a frame f will be described. Hereinafter, a base station of a first operator A will be referred to as a first base station, a base station of a second operator B will be referred to as a second base station, and a base station of a third operator C will be referred to as a third base station, for convenience of explanation.

Referring to FIG. 8, the first base station or the second base station may perform synchronization for respective terminals that the base station services. The first base station may transmit a synchronization signal to terminals that the first operator services for a synchronization duration 810. The second base station may transmit a synchronization signal to terminals that the second operator services for the synchronization duration 810. The third base station may transmit a synchronization signal to terminals that the third operator services for the synchronization duration 810. Each base station may form a time synchronization with terminals within a coverage of the corresponding base station, by transmitting the synchronization signal as a base station-specific (BS-specific) signal.

For a contention duration 820, the first base station, the second base station, and the third base station may transmit reservation signals in a first contention slot 821, a second contention slot 822 and a third contention slot 823. The first base station does not detect a signal of another operator before the first contention slot 821, and thus may determine that the first operator is the top priority level operator (for example, priority=1). The second base station does not detect a signal other than the signal of the first operator before the second contention slot 822, and thus may determine that the second operator is a next higher priority level operator (for example, priority=2). The third base station detects the signal of the first operator and the signal of the second operator before the third contention slot 823, and thus may determine that the third operator is an operator having the third priority.

The base station of the first operator which is the top priority level operator, that is, the first base station, may occupy a band as an access duration starts. The first base station may transmit a start signal 830. The start signal 830 may be a signal for informing other operators or terminals of the occupancy by the first operator. In addition, the start signal 830 may be a signal for notifying terminals of the first operator of the start of the occupancy in a shared band. The first base station may occupy the band for a duration 840 in the access duration after transmitting the start signal. For example, the first base station may process traffic existing in a buffer of the first base station.

When the occupancy of the band ends, the first base station may transmit an end signal 850. The end signal 850 may be a signal for informing other operators of the end of the band occupancy by the first operator in the frame f. That is, the end signal 850 may be a signal performing a function of an end marker. The end signal 850 may include a common sequence which is common to all operators in order to inform all operators of the end of the band occupancy. In addition, the end signal 850 may be a signal for notifying the terminals of the first operator of the end of the occupancy.

The base station of the second operator, which is the next higher priority level operator, that is, the second base station, may occupy the band as the band occupancy by the first base station ends. The second base station may detect the end signal 850 transmitted from the first base station. In response to the end signal 850 being detected, the second base station may determine that the priority of the band given to a certain operator which has a higher priority than that of the second operator ends. That is, the second operator may determine that its own priority increases by one level from among remaining operators even if the second operator does now know which operator has transmitted the end signal 850. As the band occupancy by the operator having the higher priority than that of the second operator ends, the second base station may determine that the second operator has the highest priority except for the first operator among the operators attempting to share the access duration. The second base station may determine band occupancy by the second operator. The second base station may occupy the band from a time 860. In the same way as for the first operator, the second base station may transmit a start signal, transmit and receive traffic, and transmit an end signal.

When the occupancy by the second base station ends, that is, the second base station transmits the end signal, the third base station may determine occupancy of the band. The third base station may determine the band occupancy of the third operator when the end signals are detected two times. In the same way as the second base station, the third base station may occupy the band. The third base station may determine its own band occupancy order even if the third base station does not know which operators have the prior order. In the same way as for the first operator and the second operator, the third base station may transmit a start signal and transmit and receive traffic. While the third base station is transmitting data, the frame may end. In this case, the third base station may release the band occupancy.

Thereafter, the base station and the terminal may repeatedly perform the same procedure as in the frame f to occupy a band in a frame f+1. The operators attempting to occupy the band for the access duration in the frame f, and operators attempting to occupy the band for the access duration in the frame f+1 may be differently configured.

Figure 9:
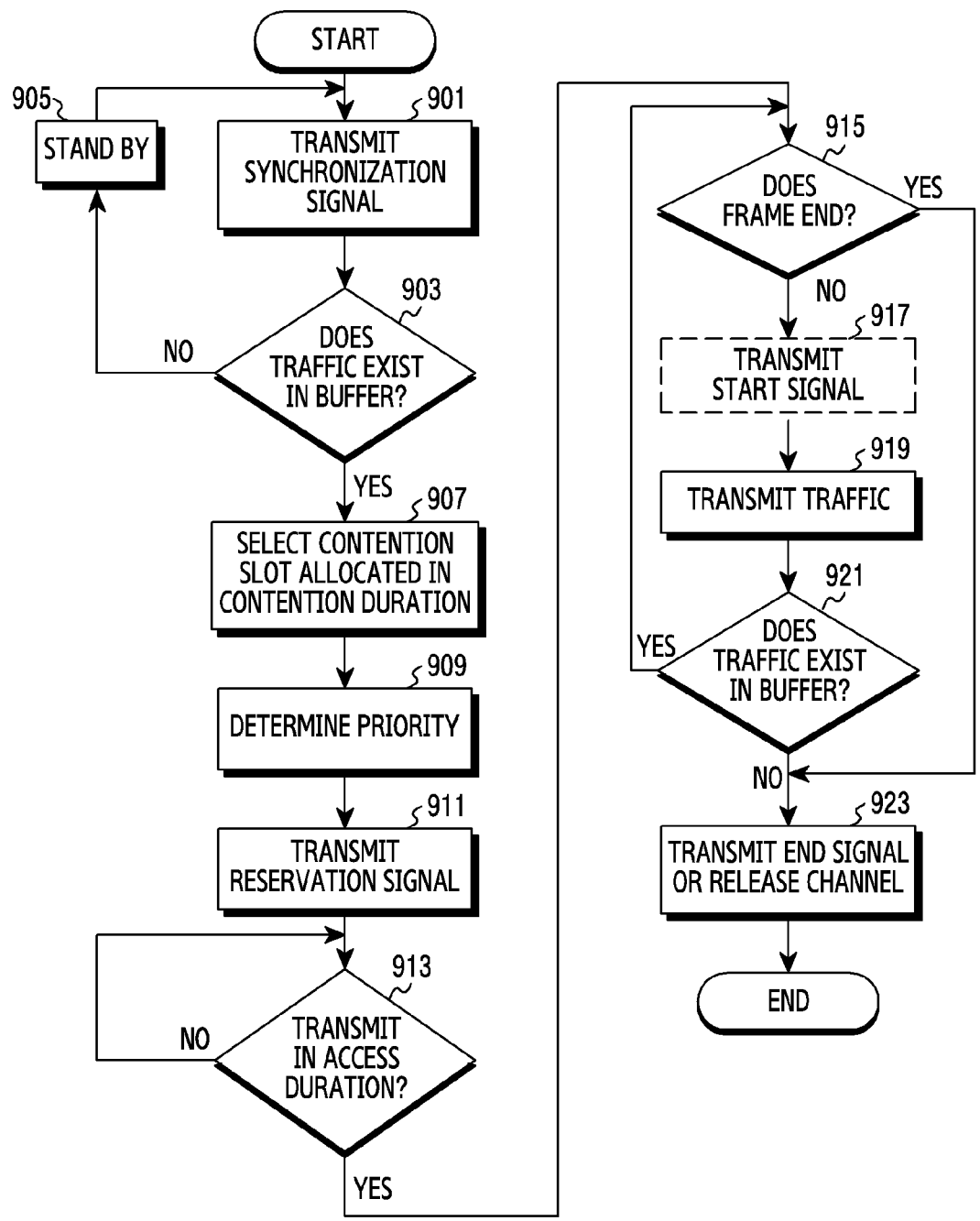
FIG. 9 is a view illustrating an operation flow of a base station for band occupancy in a wireless communication system according to various embodiments of the present disclosure.

FIG. 9 is a view illustrating an operation flow of a base station for band occupancy in a wireless communication system according to various embodiments of the present disclosure. Hereinafter, the base station may be an example of the first base station 121 of FIG. 1. For convenience of explanation, an operator of the base station may be referred to as a first operator, and another operator may be referred to as a second operator.

Referring to FIG. 9, in step 901, the base station may transmit a synchronization signal. Through the synchronization signal, the base station may synchronize with terminals subscribing to a service of the first operator. Herein, the synchronization signal may be a signal which is specific to the base station. For example, a sequence of the synchronization signal may be generated (for example, scrambled) based on an identifier of the base station.

In step 903, the base station may determine whether traffic exists in a buffer. When the traffic does not exist in the buffer, the base station may perform step 905. When the traffic does exist in the buffer, the base station may perform step 907.

In step 905, the base station may stand by. Since there is no traffic to be processed, the base station may not be required to occupy a shared band in a current frame. The base station may not participate in a contention between operators in a contention duration, and may stand by for a next resource period (for example, a frame). Thereafter, the base station may resume step 901.

In step 907, the base station may select a contention slot allocated in the contention duration. The base station may attempt to occupy a band in an access duration in the frame in order to process the traffic existing in the buffer. The base station may perform a contention procedure to occupy the band in the access duration of the frame. The base station may identify the contention slot in the contention duration of the frame to perform the contention procedure. The base station may identify the contention slot in a content range allocated in the contention duration. According to various embodiments, the contention range may be determined based on at least one of an access probability of each operator, a size of a load of a base station of each operator, a resource occupancy rate of each base station, and a variance of a cell.

In step 909, the base station may determine a priority of the first operator of the base station. The base station may monitor other slots before the contention slot identified in step 907 in order to determine the priority of the first operator. When n number of reservation signals are detected in slots before the slot (hereinafter, a first slot) identified in step 907, the base station may determine the priority of the first operator to an n+1-th priority. For example, when no signal is detected before the first slot, the base station may determine that the first operator is an operator having the highest priority. In another example, when two reservation signals are detected before the first slot, the base station may determine that the first operator is an operator having the third priority.

In step 911, the base station may transmit a reservation signal. The base station may transmit the reservation signal during the contention slot identified in step 907, that is, during the first slot. The reservation signal may provide information regarding priorities to next priority level operators. For example, the base station of the second operator may determine that the priority of the second operator is lower than the priority of the first operator according to the reservation signal of the first operator transmitted during the first slot.

In step 913, the base station may determine whether to transmit traffic fir the access duration. The base station may determine whether to transmit traffic for the access duration according to the priority of the first operator determined in step 909. For example, when the first operator is determined to be the top priority level operator in step 909, the base station may determine to transmit traffic for the access duration immediately when the content duration ends. That is, the base station may perform step 915 when the access duration of starts. In another example, when the first operator is not determined as the top priority level operator in step 909, the base station may defer transmitting traffic in the access duration until an end signal of another operator is detected or the frame ends. When as many end signals of other operators as the number (for example, n–1) determined according to the priority order (for example, n) determined in step 909 are detected, the base station may determine to transmit traffic in the access duration. For example, when as many end signals of other operators as the number of reservation signals of other operators detected before the first slot are detected, the base station may determine to transmit traffic. Herein, other operators may be operators having higher priorities than that of the first operator. Thereafter, the base station may perform step 915 when all of the end signals of the operators having higher priorities than that of the first operator are detected or the frame ends.

In step 915, the base station may determine whether the frame ends. The frame may be a unit in which one contention is resolved. When the frame does not still end, the base station may perform step 917. However, when the frame ends, the base station may end the band occupancy procedure in the corresponding frame to make a new contention duration. When the frame ends, the base station may perform step 923.

In step 917, the base station may transmit a start signal. The base station may transmit the start signal to inform occupancy of the band in the current frame. The base station may transmit the start signal to inform terminals in the coverage of the base station of occupancy of the band. In this case, the start signal may be a base station-specific signal. When the start signal has been already transmitted in the current frame, the base station may not transmit the start signal. That is, when it is determined that the frame does not end in step 915 to process residual traffic in step 921, which will be described below, the base station may not perform step 917. The base station may not perform step 917 and may directly perform step 919 to process residual traffic.

In step 919, the base station may transmit traffic. Herein, transmitting traffic may include not only transmitting downlink data from the base station to a terminal, but also moving traffic through the band, such as receiving data, transmitting or receiving a control message.

In step 921, the base station may determine whether traffic exists in the buffer. After transmitting traffic in step 919, the base station may determine whether there exists residual traffic in the buffer. The base station may resume step 915 when it is determined that there exists traffic in the buffer.

In step 923, the base station may transmit an end signal or release a channel. The base station may determine to end the band occupancy when all traffic in the buffer is processed. The base station may transmit the end signal to inform another operator of the end of the band occupancy by the first operator. Herein, another operator may be an operator having a lower priority than that of the first operator. The base station should inform another operator of the end of the band occupancy, and the end signal may be a signal that is common to all operators. When the frame ends in step 915, the base station may release the channel. In this case, the channel may be released without transmitting the end signal.

Figure 10:
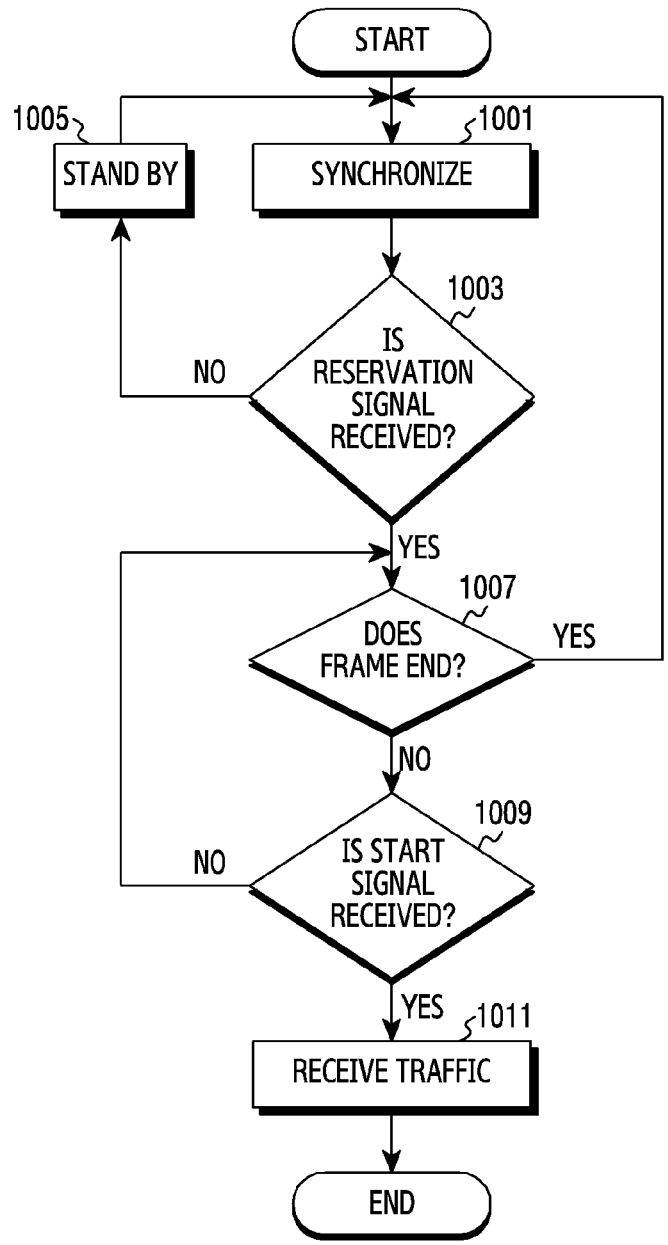
FIG. 10 is a view illustrating an operation flow of a terminal for band occupancy in a wireless communication system according to various embodiments of the present disclosure.

FIG. 10 is a view illustrating an operation flow of a terminal for band occupancy in a wireless communication system according to various embodiments of the present disclosure. Hereinafter, the terminal is an example of the first terminal 131 of FIG. 1. For convenience of explanation, an operator of a service to which the terminal subscribes may be referred to as a first operator, and another operator may be referred to as a second operator.

Referring to FIG. 10, in step 1001, the terminal may perform synchronization. The terminal may synchronize with a base station of the first operator (hereinafter, referred to as a first base station) based on a synchronization signal transmitted from the base station.

In step 1003, the terminal may determine whether a reservation signal is transmitted. The terminal may determine whether a reservation signal is transmitted for a contention duration. The terminal may determine whether a reservation signal transmitted by the first base station in a contention slot of the first operator is detected. When the reservation signal is not transmitted, the terminal may perform step 1005. When the reservation signal is transmitted, the terminal may perform step 1007.

In step 1005, the terminal may stand by. The terminal may stand by until a reservation signal transmitted by the first base station is detected. This is because the reservation signal is not transmitted when the first operator does not occupy a band in a corresponding frame. The terminal may stand by until a next resource period (for example, a next frame), and then may resume step 1001.

In step 1007, the terminal may determine whether the frame ends. The terminal may determine whether the frame ends in an access duration. When the frame ends, the terminal resumes step 1001. When the frame ends, the terminal may synchronize with the first base station again to synchronize in a next resource period (for example, a frame). On the other hand, before the frame ends, the terminal may perform step 1009.

In step 1009, the terminal may determine whether a start signal is received. The terminal may determine whether the start signal transmitted by the first base station is received. Herein, the start signal may be a base station-specific signal. The start signal may be transmitted based on a priority of the first operator among operators attempting to occupy the access duration of the corresponding frame. When all traffic of an operator having a higher priority than that of the first operator is processed, that is, when band occupancy by an operator having a higher priority than that of the first operator ends, the first base station may start band occupancy.

The terminal may not recognize the priority of the first operator. Therefore, the terminal may be required to transmit a start signal when the first operator occupies the band. The terminal may determine that the band occupancy by the first operator starts in the corresponding frame through the start signal. A scheduling procedure may be initiated through the start signal.

In step 1011, the terminal may receive traffic. The traffic may include at least one of control information and data which are transmitted from the first base station. Although FIG. 10 depicts that the terminal receives traffic in step 1011, the terminal may transmit a scheduling request to the base station, and accordingly, uplink traffic may be transmitted.

A terminal which manages discontinuous reception (DRX) may be considered. The terminal may repeat a DRX ON mode and a DRX OFF mode in a cycle of DRX. In the DRX ON mode, the terminal may search a contention duration. For example, when the base station of the same operator as the terminal transmits a reservation signal in the contention duration, that is, when the terminal receives the reservation signal in a contention slot in the contention duration, the terminal may maintain the DRX ON mode until an access duration. In another example, when the reservation signal of the base station is not detected in the contention duration, the terminal may switch back to the DRX OFF mode before the access duration. In some embodiments, a paging occasion may be configured in the contention duration for band occupancy of the present disclosure. This is because the terminal requires a contention procedure to occupy a band in order to receive page information in an idle state.

As described above with reference to FIGS. 8 to 10, the base station of the operator transmits a start signal for band occupancy, and transmits an end signal for another operator, such that resources in the access duration can be efficiently used. Each operator determines its priority by selecting a contention slot in the contention range, and the band is shared between the operators for the access duration according to the determined priority.

Hereinafter, operations of respective network entities (for example, a manager device, a base station) for configuring a contention variable of each operator will be described with reference to FIGS. 11 to 13.

Contention Variable Configuration

Figure 11:
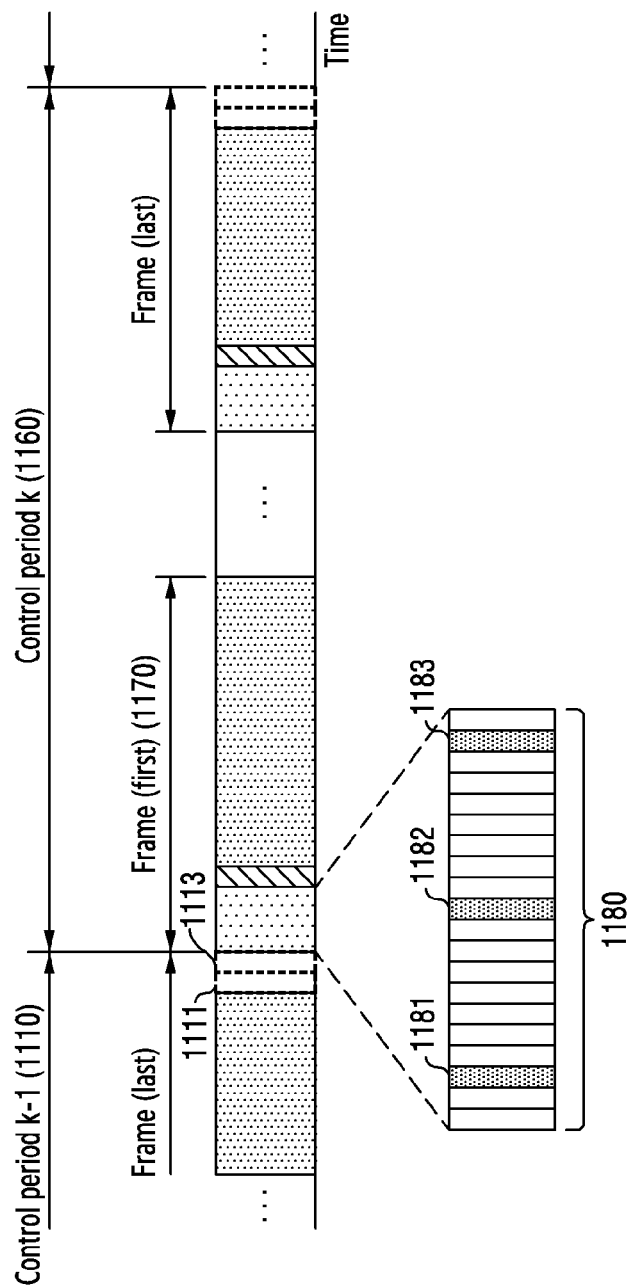
FIG. 11 is a view illustrating an example of a contention variable configuration in a wireless communication system according to various embodiments of the present disclosure.

FIG. 11 is a view illustrating an example of a content variable configuration in a wireless communication system according to various embodiments of the present disclosure.

With reference to FIG. 11, operations between base stations of respective operators and a manager device in a control period k−1 and a control period k will be described. In the following description, the base stations of the respective operators are referred to as a first base station of a first operator, a second base station of a second operator, and a third base station of a third operator for convenience of explanation. In addition, the manager device is illustrated as a device configured separately from the base station, but the present disclosure is not limited thereto. The manager device may be an example of the manager device 110 of FIG. 1.

Referring to FIG. 11, to determine a contention range of operators managed in a control period 1160 (control period k), signaling between the manager device and the base stations of the respective operators may be required in a control period 1110 (control period k−1) which is a previous control period. For example, the manager device and the base stations of the respective operators may perform signaling in a last frame of the control period 1110.

In a duration 1111 of the last frame (for example, a slot of the last frame), the base station of each operator may transmit sharing assisted information to the manager device. Herein, the sharing assisted information may include access parameters for configuring a contention variable for each operator for band sharing. The access parameters may include at least one of an access probability, a resource occupancy rate, a size of a contention range, a probability distribution of a contention slot in the contention range, and the number of contention slots.

In some embodiments, the sharing assisted information may include channel information. For example, the channel information may be information regarding requirements of traffic to be processed at the base station of the operator. The channel information may include quality of service (QoS) required for processing traffic. In addition, the channel information may include a rate required for traffic. In another example, the channel information may include information regarding a channel state. Herein, the channel state information may be information regarding a degree of channel variance such as frequency selectivity in a cell (coverage) provided by the base station of the operator.

In some embodiments, the sharing assisted information may include resource information. For example, the resource information may include information regarding an amount of resource in the base station of the operator. The information regarding the amount of resource may indicate an amount of resource occupied by the base station or an amount of resource required through scheduling. The amount of resource may correspond to a size of traffic. In another example, the resource information may include statistical information regarding a frequency or continuity of resource occupancy of the base station in the previous control period.

In a duration 1113 of the last frame (for example, a slot of the last frame), the manager device may transmit contention configuration information to the base station of each operator. Herein, the contention configuration information may be information for configuring a contention variable of each operator.

The manager device may calculate a contention matric of each operator from the sharing assisted information of the operators, as the contention configuration information. The contention matric may be a parameter for the base station of each operator to configure a contention variable in the contention duration. The base station may identify a contention duration and a contention slot through the contention matric and a mapping function. In some embodiments, the manager device may calculate an access probability of each operator. Herein, the access probability may be a metric indicating a probability that an operator occupies a band. The manager device may calculate the probability of occupancy of each operator, that is, the access probability, from the sharing assisted information. For example, the manager device may calculate the access probability based on at least one of a system efficiency of each operator, a cost, a delay, the number of operators participating in the contention to share the band, a channel state of each operator, and channel information of each operator. The base station of each operator may determine a contention range from the access probability, and may identify a contention slot in the contention range.

In some other embodiments, the manager device may calculate a resource occupancy ratio of each operator. Herein, the resource occupancy ratio may be a ratio of a band occupied by an operator or a metric indicating an amount of resource to be occupied in a band. The manager device may calculate the resource occupancy rate of each operator from the sharing assisted information. The manager device may calculate an access probability based on at least one of statistical information related to an amount of resource occupied by each operator in a previous control period, system efficiency, a cost, a delay, the number of operators participating in a contention to share a band, a channel state of each operator, and channel information of each operator. The base station of each operator may determine a contention range from the resource occupancy rate, and may identify a contention slot within the contention range.

The contention range and the contention slot may be determined by the manager device rather than by the base station. After determining at least one of the contention range or contention slot, the manager device may transmit at least one of the contention range or the contention slot determined to the base station. The manager device may further satisfy fairness between operators by directly configurating parameters related to the contention range or the contention slot. Hereinafter, an embodiment in which the manager device determines parameters related to the contention range and the contention slot as contention configuration information will be described.

The manager device may determine the contention range of each operator. The manager device may determine a size of the contention range. In some embodiments, when a target rate is relatively high or a size of traffic is relatively large, the manager device may increase the size of the contention range. As the size of the contention range configured by the operator increases, the operator increases the opportunity to occupy a band in the plurality of frames in the control period. The manager device may determine a starting point of the contention range. In some embodiments, the manager device may set the starting point of the contention range high in order to assign a high priority to a terminal subscribing to a relatively high cost service, a base station, or an operator.

The manager device may determine a method for identifying a contention slot in the contention range. In some embodiments, the manager device may determine a probability distribution which is set when each operator selects a contention slot in the contention range. For example, the manager device may set such that a probability that a contention slot is randomly determined in each contention range is the same through a uniform probability distribution. When the band to be shared by operators is an unlicensed band, the manager device may set such that a contention slot is identified based on a uniform probability distribution to achieve harmony with other nodes (for example, an access point) in the unlicensed band. In another example, the manager device may set such that a contention slot is randomly determined by reflecting a statistical characteristic of traffic averagely required by each operator, through a normal probability distribution.

The manager device may determine the number of contention slots. One contention slot may be allocated to one operator in the contention duration. As a reservation signal is transmitted in a contention slot identified by a specific operator, the base stations of the operators may determine the priority of the corresponding operator. Accordingly, the number of contention slots may be set to 1 as default.

For example, when the number of operators for sharing a band is smaller than the size of the contention duration, the contention duration may be wasted. In some embodiments, the manager device may determine to allow two or more contention slots to be identified for each operator. The base station may transmit a reservation signal during N (N is an integer number larger than or equal to 2) number of identified contention slots. The base station of the operator may determine a priority of the operator by detecting N times more reservation signals of other operators than when the number of contention slots is 1. For example, the base station may determine the priority of the operator according to the following equation:

$$p = \left\lfloor \frac{S+1}{N} \right\rfloor \quad \text{Equation 1}$$

where p is a priority of an operator, S is the number of reservation signals determined before a contention slot of the operator, and N is the number of contention slots of the operator.

By transmitting reservation signals via more than one slots, a problem arising when a reservation signal of another base station is delayed due to a great influence of propagation delay can be reduced.

The manager device may generate contention configuration information including at least one of the parameters related to the contention matric, the contention range, or the contention slot, determined as described above. The manager device may transmit the contention configuration information to the base station of each operator. The base station of each operator may configure a contention variable according to the contention configuration information transmitted before the control period 1160.

In a first frame 1170 of the control period 1160, the base station of each operator may select (identify) a contention slot according to the configured contention variable.

The base station may configure the contention variable based on contention configuration information. For example, the base station may identify a contention range in the contention duration based on the contention configuration information. In addition, the base station may identify a contention slot in the contention range, based on the contention configuration information. For example, the first base station may identify a first contention slot 1181 of the first operator in a contention duration 1180. The second base station may identify a second contention slot 1182 of the second operator in the contention duration 1180. The third base station may identify a third contention slot 1183 of the third operator in the contention duration 1180. Although not shown in FIG. 11, the contention range may be differently configured according to each operator.

The base stations of the respective operators may select contention slots in the contention duration in the control period 1160, based on the contention configuration information provided in the control period 1110. According to an embodiment, the contention configuration information may be updated on a basis of the control period.

Figure 12:
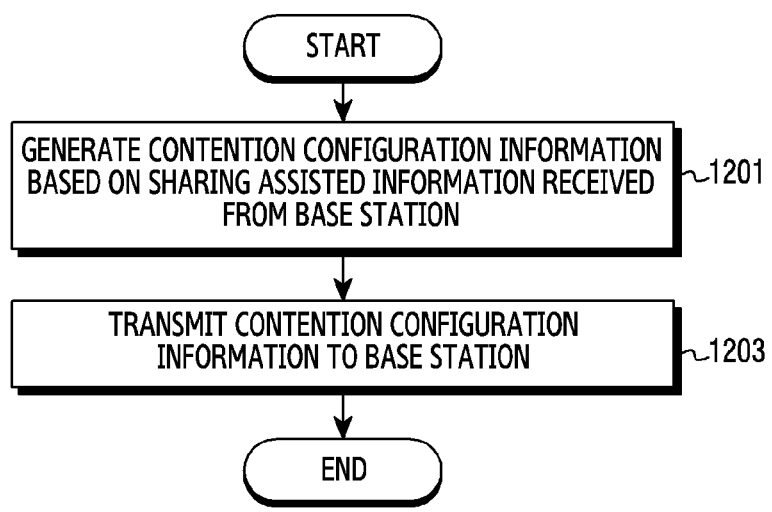
FIG. 12 is a view illustrating an operation flow of a manager device for a contention variable configuration in a wireless communication system according to various embodiments of the present disclosure.

FIG. 12 is a view illustrating an operation flow of a manager device for a contention variable configuration in a wireless communication system according to various embodiments of the present disclosure. Hereinafter, the manager device may be an example of the manager device 110 of FIG. 1.

Referring to FIG. 12, in step 1201, the manager device may generate contention configuration information based on sharing assisted information received from a base station.

The sharing assisted information may include at least one of a channel state of a base station, requirements (for example, service quality) of a terminal subscribing to a service of an operator, requirements (for example, a transmission speed) of a system managed by an operator, and characteristics of traffic (for example, QoS, packet delay, quality class indicator (QCI), packet loss). In some embodiments, the manager device may periodically receive the sharing assisted information from the base station. In this case, a period in which the sharing assisted information is received may correspond to the length of the control period of FIG. 2. In some other embodiments, the base station may transmit the sharing assisted information when performing band sharing. That is, the manager device may aperiodically receive the sharing assisted information.

The manager device may generate the contention configuration information based on at least one of sharing assisted information of each operator and the number of operators attempting to share a band during a corresponding control period, system efficiency of the band, reliability, and channel capacity. The contention configuration information may include at least one of a contention matric, a contention duration, an identification method of a contention slot, and the number of contention slots. For example, the manager device may calculate an access probability, based on a state (characteristic or amount) of traffic in the base station of each operator. In another example, the manager device may determine the number of contention slots in the contention duration of each operator, based on the number of operators attempting to share the band and the channel state.

In step 1203, the manager device may transmit the contention configuration information to the base station. The manager device may transmit the contention configuration information before the frame of the next control period k starts. For example, the manager device may transmit the contention configuration information in the last frame of the current control period k−1. According to various embodiments, the manager device may transmit the contention configuration information via a backhaul with the base station. In some embodiments, the manager device may not be a device that is geographically separated from the base station. The base station may include the manager device. In this case, the base station may receive sharing assisted information from a base station of another operator, and may transmit the contention configuration information to the base station of another operator. The base station may configure a contention configuration matric, a contention range, and a contention duration for the operator of the base station by itself.

Figure 13:
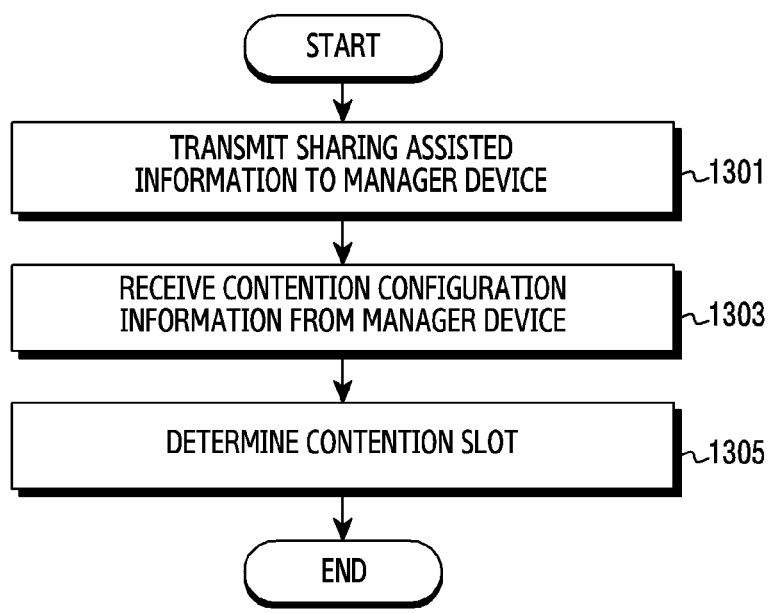
FIG. 13 is a view illustrating an operation flow of a base station for a contention variable configuration in a wireless communication system according to various embodiments of the present disclosure.

FIG. 13 is a view illustrating an operation flow of a base station for a contention variable configuration in a wireless communication system according to various embodiments of the present disclosure. Hereinafter, the base station may be an example of the first base station 121 or the second base station 122 of FIG. 1.

Referring to FIG. 13, in step 1301, the base station may transmit sharing assisted information to a manager device. The base station may generate sharing assisted information based on system requirements configured by the operator, characteristic of traffic, service requirements of the operator, and information of a terminal subscribing to each service. The sharing assisted information may correspond to the sharing assisted information of FIG. 12.

In step 1303, the base station may receive contention configuration information from the manager device. The sharing configuration information may correspond to the contention configuration information of FIG. 12.

In step 1305, the base station may determine a contention slot. The base station may determine the contention slot based on the contention configuration information. The base station may configure a contention variable based on the contention configuration information. Herein, configuring the contention variable may include configuring a contention range and configurating a contention slot in the contention range. Specifically, the base station may determine a contention range according to the contention configuration information. For example, the base station may determine the contention range according to a contention matric (for example, an access probability, a resource occupancy rate) and a mapping function which are included in the contention configuration information. An example of the mapping function will be described below with reference to FIGS. 18A to 18D. The base station may identify a contention slot in the contention range. In some embodiments, the base station may determine the contention slot according to the same probability, that is, a uniform distribution. In some other embodiments, the base station may determine the contention slot according to a normal distribution.

Embodiments for selecting the contention slot have been described with reference to FIGS. 11 to 13. Although FIGS. 11 to 13 depict that the manager device is a device separate from the base station of each operator, the present disclosure is not limited thereto as described above. That is, according to various embodiments, each base station may determine the contention range by calculating an access probability of each operator.

Hereinafter, operations for determining a contention duration and an access duration in a control period will be described with reference to FIGS. 14 to 17.

Frame Configuration

Figure 14:
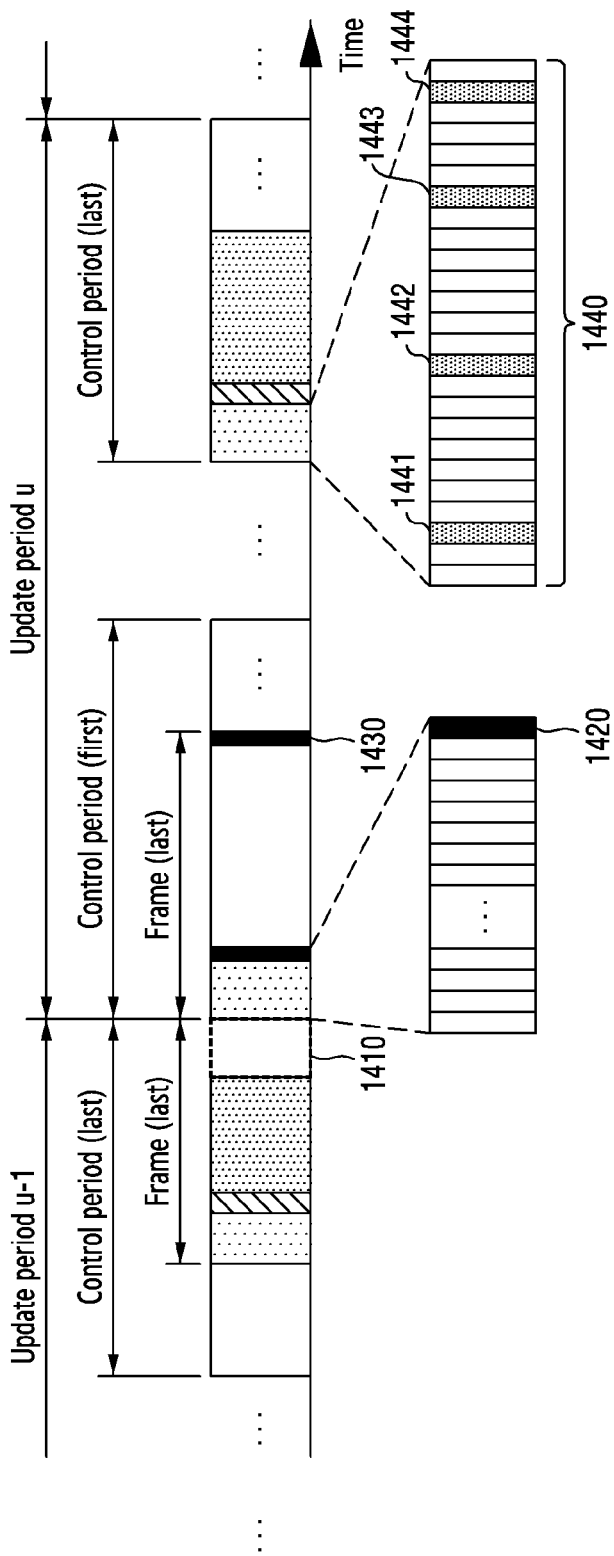
FIG. 14 is a view illustrating an example of a frame configuration in a wireless communication system according to various embodiments of the present disclosure.

FIG. 14 is a view illustrating an example of a frame configuration in a wireless communication system according to various embodiments of the present disclosure. Hereinafter, the frame configuration may include contention duration allocation or access duration allocation. With reference to FIG. 14, operations among a manager device, a base station of each operator, and a terminal in an update period u−1 and an update period u will be described. Hereinafter, the base stations of the respective operators will be referred to as a first base station of a first operator, a second base station of a second operator, a third base station of a third operator, and a fourth base station of a fourth operator, for convenience of explanation. In addition, a terminal serviced by the first base station is referred to as a first terminal, a terminal serviced by the second base station is referred to as a second terminal, a terminal serviced by the third base station is referred to as a third terminal, and a terminal serviced by the fourth base station is referred to as a fourth terminal. In addition, the manager device will be described with reference to a device configured separately from the base station, but the present disclosure is not limited thereto.

Referring to FIG. 14, to determine a contention duration and an access duration managed in the update period u, the manager device and the base station of each operator may perform mutual signaling in the update period u−1, which is the previous update period. For example, the manager device and the base station may perform signaling in a duration 1410 in a last frame of a last control period of the update period u−1.

In the duration 1410, the base station of each operator may update a license to occupy a shared band. In this case, the manager device may acquire information on the number of operators (number of base stations) attempting to occupy the shared band, that is, participating in spectrum sharing. In the last frame of the update period u−1, each operator updates the license, such that the configurations of the operators participating in the spectrum sharing can be updated (maintained or changed) in the update period u. For example, the operators participating in the spectrum sharing in the update period u−1 may include the first operator, the second operator, and the third operator. Thereafter, through the license updating procedure, the operators participating in the spectrum sharing in the update period u may include the first operator, the second operator, the third operator, and the fourth operator.

The manager device may determine the access duration and the contention duration, based on at least one of the number of base stations updating licenses, system requirements for respective base stations updating licenses, and characteristics of a mobile network provided to the base stations. For example, the manager device may allocate a relatively longer contention duration as the number of operators attempting to share the band increases. Accordingly, the band occupancy opportunity may be assigned to more operators through a contention. In another example, when the base station of the operator attempting to share the band is a small base station (for example, a femto base station, a pico station), the manager device may set the length of the contention duration relatively short. In some embodiments, the contention duration may be set to a multiple of a unit (for example, a sub-frame) forming the frame. As the contention duration is determined on a basis of a multiple of a sub frame, an overhead caused by a boundary may be reduced.

The manager device may provide information regarding the contention duration and the access duration (hereinafter, duration information) to the base station of each operator. The base station may update the predetermined contention duration and access duration based on the duration information. The base station may configure the contention duration and the access duration to be applied to the update period u.

The base station may inform terminals related to the operator of the base station of the newly configured contention duration and access duration. In some embodiments, the base station may transmit the duration information to the terminals explicitly. Although not shown in FIG. 14, the base station may transmit the duration information in the access duration of the first frame in the update period u. The terminal may identify the contention duration and the access duration to be applied to the update period u by decoding the duration information.

In some other embodiments, the base station may inform the terminals of the contention duration and the access duration implicitly. For example, the base station may transmit a first notification signal 1420 at a time when the contention duration of the first frame ends. In addition, the base station may transmit a second notification signal 1430 at a time when the access duration of the first frame ends. Herein, the first notification signal 1420 or the second notification signal 1430 may be one of a synchronization signal, a reference signal, or a separate dummy signal, as a base station-specific signal. The terminal may identify the contention duration and the access duration to be applied to the update period u, based on a starting time of the frame, a receiving time of the first notification signal 1420, and a receiving time of the second notification signal 1430. For example, the terminal may identify the contention duration according to a difference between the starting time of the frame and the receiving time of the first notification signal 1420. In addition, the terminal may identify the access duration according to the size of the frame and the identified contention duration. In another example, the terminal may identify the access duration according to the receiving time of the first notification signal 1420 and the receiving time of the second notification signal 1430.

In the duration 1410, the license of each operator is updated, and accordingly, the configurations of the operators participating in band sharing through the contention duration in the update period u may be different from the configurations of the operators in the update period u−1. For example, the operators participating in the band sharing in a contention duration 1400 may include the first operator, the second operator, the third operator, and the fourth operator. The first base station may identify a first contention slot 1441 in the contention duration 1400. The second base station may identify a second contention slot 1442 in the contention duration 1400. The third base station may identify a third contention slot 1443 in the contention duration 1400. The fourth base station may identify a fourth contention slot 1444 in the contention duration 1400. According to various embodiments, the base stations of the operators may perform a contention procedure with the fourth operator being added in the current update period in comparison to the previous update period (for example, the update period u−1). Although not shown in FIG. 14, the length of the contention duration allocated in the frame may also increase as the number of operators increases.

According to various embodiments, the contention slot and the size of the contention duration necessary for band sharing are adaptively adjusted in every update period, and the update period according to various embodiments may be referred to as a resource update period.

As described above, the number of operators attempting to share the band may be adaptively changed, and when the length of the frame is relatively long, the contention duration needs to be adjusted according to the number of operators participating in the band sharing. This is because, when the length of the frame is relatively long, the band occupancy probability of each operator is abruptly reduced due to a failure in the contention. As the length of the contention duration in the frame is adaptively allocated, problems of resource occupancy efficiency and fairness between operators can be solved.

Figure 15:
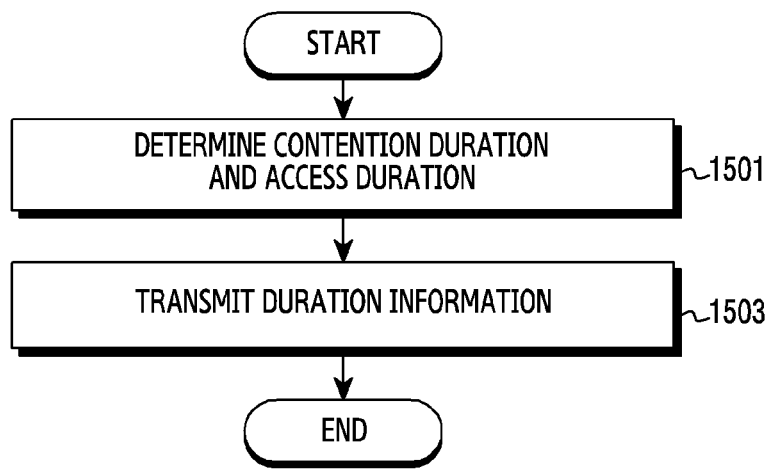
FIG. 15 is a view illustrating an operation flow of a manager device for a frame configuration in a wireless communication system according to various embodiments of the present disclosure.

FIG. 15 is a view illustrating operation flow of a manager device for a frame configuration in a wireless communication system according to various embodiments of the present disclosure. Hereinafter, the manager device is an example of the manager device 110 of FIG. 1.

In step 1501, the manager device may determine a contention duration and an access duration. The manager device may determine the access duration and the contention duration, based on at least one the number of operators participating in spectrum sharing, system requirements, and a characteristic of a mobile network provided to a base station. The manager device may determine an operator of a base station that updates a license in the last control period of the update period u−1, as an operator participating in spectrum sharing in the update period u. The system requirements may include a transmission speed, a transmission capacity required in a mobile network managed by each operator. The mobile network characteristic may include a size of a managed base station, a size of a cell, types of serviced terminals, a variance of a channel, or the like.

In step 1503, the manager device may transmit duration information. The manager device may transmit the duration information including the contention duration and the access duration. In some embodiments, the manager device may broadcast the duration information. In some other embodiments, the manager device may transmit the duration information to the base station of each of the operators participating in spectrum sharing. The manager device may transmit the duration information via a backhaul network.

Figure 16:
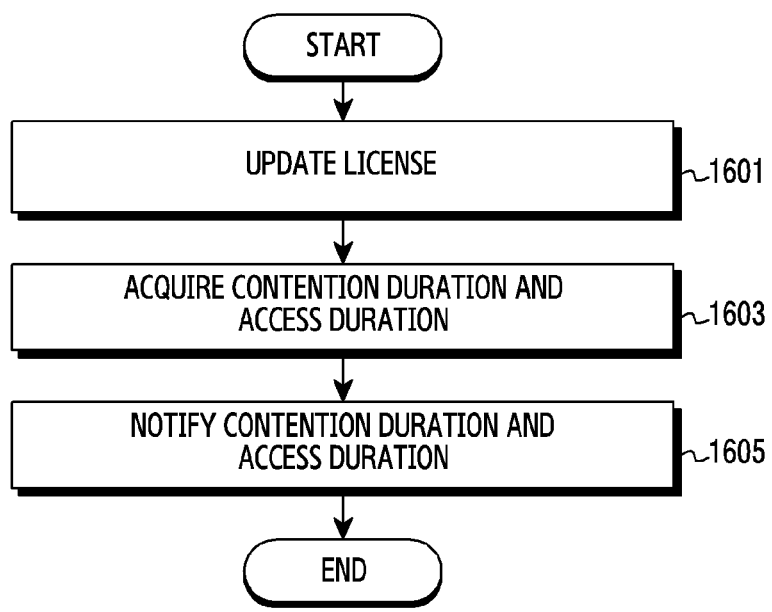
FIG. 16 is a view illustrating an operation flow of a base station for a frame configuration in a wireless communication system according to various embodiments of the present disclosure.

FIG. 16 is a view illustrating an operation flow of a base station for a frame configuration in a wireless communication system according to various embodiments of the present disclosure. Hereinafter, the base station may be an example of the first base station 121 or the second base station 122 of FIG. 1.

In step 1601, the base station may update a license. The base station may update the license of the operator of the base station to share a band. Herein, the license may refer to a permit for using a shared band. According to embodiments, the update period may be referred to as a license update period. The base station updates the license, thereby informing a manager device (or another base station including the manager device) that the base station will participate in a contention procedure for band sharing in a next update period.

In step 1603, the base station may acquire a contention duration and an access duration. The base station may receive duration information from the manager device. The base station may acquire the contention duration and the access duration included in the duration information. According to some embodiments, when the base station includes the manager device, the base station may acquire a contention duration and an access duration by itself according to information received from another base station.

In step 1605, the base station may notify the contention duration and the access duration. The base station may notify the contention duration and the access duration acquired in step 1603, such that a terminal subscribing to the service of the operator of the base station can identify the contention duration and the access duration. The base station may transmit information regarding the contention duration and the access duration to the terminal through explicit signaling, or may provide the information regarding the contention duration and the access duration to the terminal implicitly (for example, at a time of transmitting a notification signal).

Figure 17:
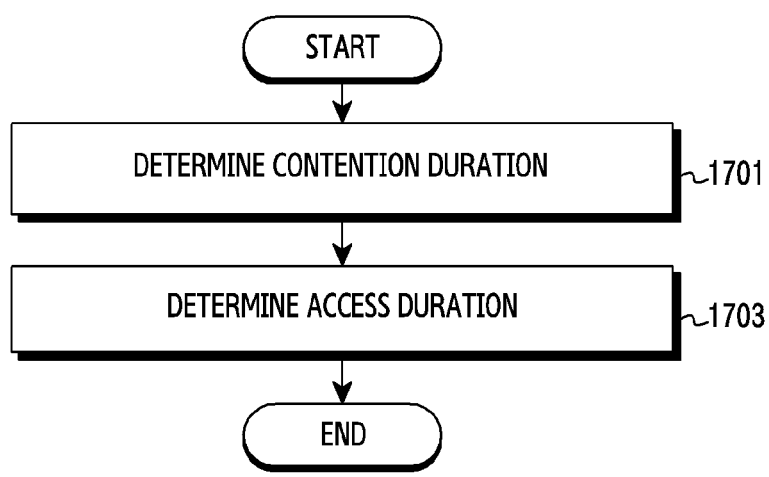
FIG. 17 is a view illustrating an operation flow of a terminal for a frame configuration in a wireless communication system according to various embodiments of the present disclosure.

FIG. 17 is a view illustrating an operation flow of a terminal for a frame configuration in a wireless communication system according to various embodiments of the present disclosure. Hereinafter, the terminal may be an example of the first terminal 131, the second terminal 132, or the third terminal 133, or the fourth terminal 134 of FIG. 1.

In step 1701, the terminal may determine a contention duration. In some embodiments, the terminal may determine a contention duration by receiving a first notification signal. For example, the terminal may determine the contention duration according to a difference between a starting time of a frame and a receiving time of the first notification signal. The first notification signal may be a signal that is transmitted from a base station in a last slot of a contention duration. In some embodiments, the terminal may determine the contention duration by decoding duration information when receiving a message including the duration information.

In step 1703, the terminal may determine an access duration. In some embodiments, the terminal may determine a duration of the frame except for the contention duration as the access duration. In some other embodiments, the terminal may determine the access duration by receiving a second notification signal. The terminal may determine the access duration according to a difference between a receiving time of the second notification signal and the receiving time of the first notification signal. The second notification signal may be a signal that is transmitted in a last slot of an access duration. In some other embodiments, the terminal may determine the access duration by decoding duration information when receiving a message including the duration information.

Through FIGS. 6 to 17, the operations for occupying the shared band in the contention duration and the access duration have been described. Hereinafter, an example of a mechanism for selecting a contention slot will be described through FIGS. 18A to 18D.

Contention Slot Selection

Figure 18A:
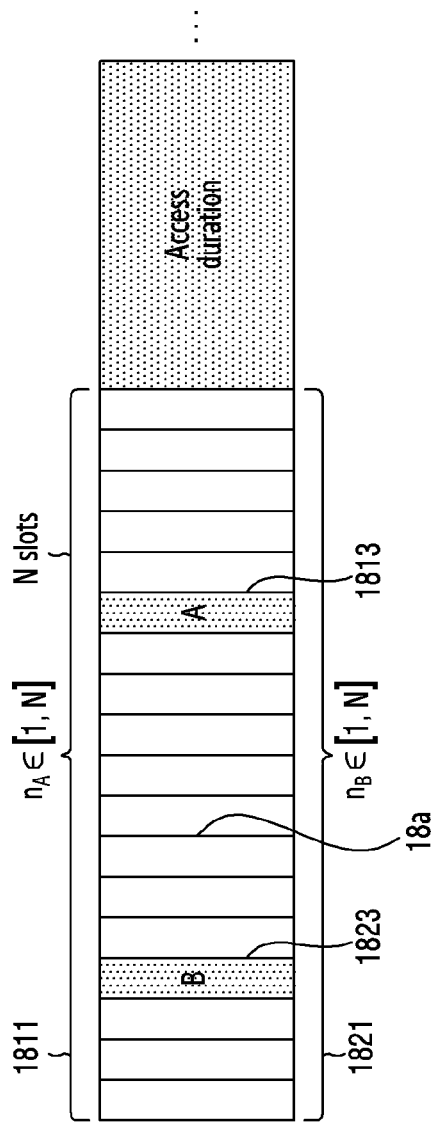
FIG. 18A is a view illustrating an example of contention slot selection according to various embodiments of the present disclosure.

FIG. 18A is a view illustrating an example of contention slot selection according to various embodiments of the present disclosure. Hereinafter, a situation where a first base station of a first operator A and a second base station of a second operator B select respective contention slots in a contention range will be described for convenience of explanation.

Referring to FIG. 18A, a contention duration may include N number of slots. In the embodiment of FIG. 18A, a probability of band occupancy is the same for operators. That is, all of the operators are guaranteed fair band sharing (or spectrum sharing). The probability that each base station identifies a contention slot in the contention duration is the same for all of the base stations. In some embodiments, a resource occupancy rate of each operator may be 1/M (M is the number of operators to occupy an access duration). The base station may determine a contention range based on the following equation:

$$f(\mu_{i,k})=([Z_{i,k}^{start},Z_{i,k}^{end}])=([1,N]) \qquad \text{Equation 2}$$

where $\mu_{i,k}$ is a resource occupancy rate of the i-th operator in the k-th control period, and $f(\cdot)$ function is a mapping function indicating a contention range corresponding to a resource occupancy rate. $Z_{i,k}^{start}$ is a start slot of the contention range of the i-th operator in the k-th control period. $Z_{i,k}^{end}$ is a last slot of the contention range of the i-th operator in the k-th control period. N is the number of slots in the contention duration.

For example, a first contention range 1811 of the first operator may be determined by N number of slots which are the entire contention duration. A second contention range 1821 of the second operator may be determined by N number of slots which are the entire contention duration. The first station may identify a first contention slot 1813 among the N number of slots in the contention duration. The second base station may identify a second contention slot 1823 among the N number of slots in the contention duration.

Through the contention slot selection method described through FIG. 18A, fair slot selection and band occupancy may be performed between operators.

Figure 18B:
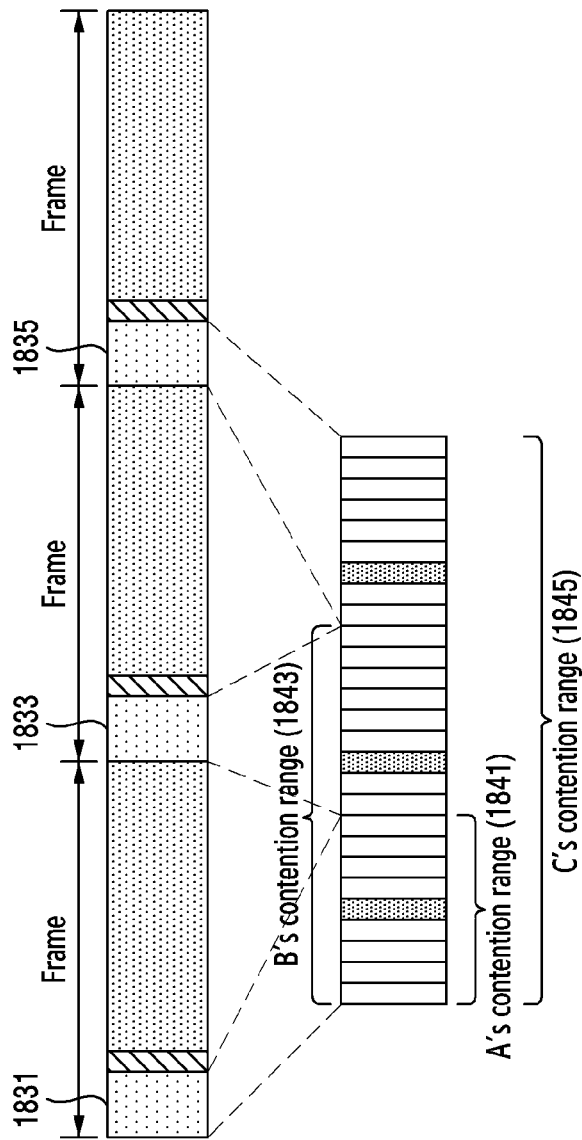
FIG. 18B is a view illustrating another example of contention slot selection according to various embodiments of the present disclosure.

FIG. 18B is a view illustrating another example of contention slot selection according to various embodiments of the present disclosure. Hereinafter, a situation where a first base station of a first operator A, a second base station of a second operator B, and a third base station of a third operator C select respective contention slots in a contention range will be described for convenience of explanation.

In the embodiment of FIG. 18B, a probability of band occupancy is the same for operators. That is, all of the operators are guaranteed fair band sharing (or spectrum sharing). Unlike in FIG. 18A, in the embodiment of FIG. 18B, a collision may be considered in the contention duration. Herein, the collision refers to a phenomenon in which two or more operators identify the same slot as a contention slot in the contention duration, and accordingly, overlap each other in occupying an access duration, and thus a channel is congested. In some embodiments, each base station may determine occurrence of a collision according to a channel state in a previous control period. For example, when a non-acknowledge (NACK) occurs by 80% or more, each base station may determine that a collision occurs in the control period. Since a longer contention duration is required, the length of the contention duration may be adaptively configured according to the collision.

Referring to FIG. 18B, for example, before the current control period, a collision may not occur in the first base station, and may occur in the second base station one time and may occur in the third base station two times. In this case, a first contention range 1841 of the first operator may include a first contention duration 1831. A second contention range 1842 of the second operator may include the first contention duration 1831 and a second contention duration 1833. A third contention range 1843 of the third operator may include the first contention duration 1831, the second contention duration 1833, and a third contention duration 1835. That is, the contention range of each operator according to embodiments of FIG. 18B may be determined according to the following equation:

$$f(\mu_{i,k})=([Z_{i,k}^{start},Z_{i,k}^{end}])=([1,c_{i,k}\cdot N]) \qquad \text{Equation 3}$$

where $\mu_{i,k}$ is a resource occupancy rate of the i-th operator in the k-th control period. $Z_{i,k}^{start}$ is a start slot of the contention range of the i-th operator in the k-th control period. $Z_{i,k}^{end}$ is a last slot of the contention range of the i-th operator in the k-th control period. N is the number of slots in one contention duration. $c_{i,k}$ is a collision parameter in the k-th control period of the i-th operator. The collision parameter may be determined according to the following equation:

$$c_{i,k} = \begin{cases} c_{i,k-1} + 1 & \text{if collision occurs} \\ 1, & \text{Otherwise} \end{cases} \qquad \text{Equation 4}$$

where $c_{i,k}$ is a collision parameter in the k-th control period of the i-th operator. $c_{i,k-1}$ is a collision parameter in the k−1-th control period of the i-th operator. When the collision does not occur, the collision parameter may be initialized.

According to embodiments of FIG. 18B, when a collision occurs in the control period, a fairness issue regarding the collision between operators can be solved by increasing the contention range in the next control period as long as the contention duration.

Figure 18C:
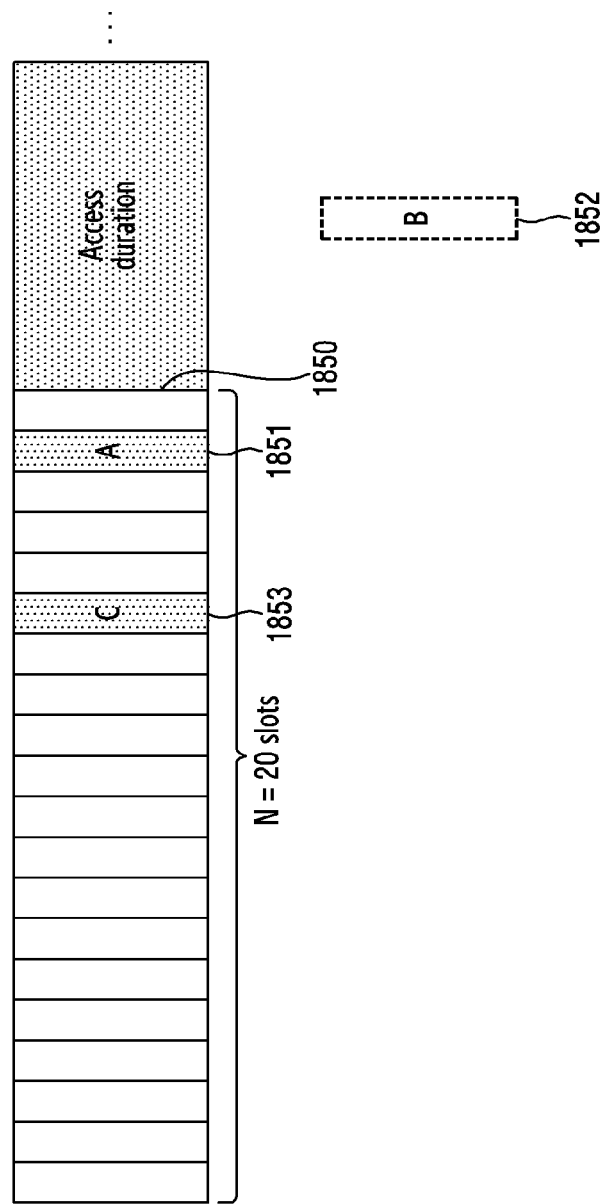
FIG. 18C is a view illustrating still another example of contention slot selection according to various embodiments of the present disclosure.

FIG. 18C is a view illustrating still another example of contention slot selection according to various embodiments of the present disclosure. Hereinafter, a situation where a first base station of a first operator A, a second base station of a second operator B, and a third base station of a third operator C select respective contention slots in a contention range will be described for convenience of explanation.

Referring to FIG. 18C, a contention duration may include N number of slots (for example, 20 slots). A contention range of each operator may be determined by one slot. The base station according to various embodiments may determine a contention range to one slot, that is, a contention slot, by setting a start slot of the contention range and a last slot of the contention range to the same value.

The base station of each operator may determine the contention range (contention slot) based on a resource occupancy rate of the operator. The resource occupancy rate may be determined based on a target channel occupancy rate and a cumulative channel occupancy rate. The resource occupancy rate may be calculated by the manager device and may be transmitted to the base station of each operator, or may be directly calculated by the base station. For example, the resource occupancy rate may be determined based on the following equation:

$$\mu_{i,k}=X_{i,k}-Y_{i,k}+Z_{i,k} \quad \text{Equation 5}$$

where $\mu_{i,k}$ is a resource occupancy rate of the i-th operator in the k-th control period, $X_{i,k}$ is a target channel occupancy rate of the i-th operator in the k-th control period, $Y_{i,k}$ is a cumulative channel occupancy rate of the i-th operator in the k-th control period, and $Z_{i,k}$ is a complement element indicating a situation of the i-th operator in the k-th control period. For example, when the complement element indicates an emergency situation, the complement element may have a positive value to increase the probability of occupancy. When the complement element does not indicate a pre-defined situation, the complement element may have 0 as a default value.

As a resource occupancy rate increases, an operator may have a higher priority than the other operators. That is, a contention slot of the operator having a high resource occupancy rate may be determined before a contention slot of an operator having a low resource occupancy rate. In some embodiments, the resource occupancy rate of each operator may be determined according to the following equation:

$$f(\mu_{i,k})=([Z_{i,k}^{start},Z_{i,k}^{end}])=([1-\mu_{i,k})\cdot N+1,(1-\mu_{i,k})\cdot N+1]) \quad \text{Equation 6}$$

where $\mu_{i,k}$ is a resource occupancy rate of the i-th operator in the k-th control period.

$Z_{i,k}^{start}$ is a start slot of the contention range of the i-th operator in the k-th control period. $Z_{i,k}^{end}$ is a last slot of the contention range of the i-th operator in the k-th control period. N is the number of slots in the contention duration.

For example, the channel occupancy rate of the first base station may be "0.3" and the cumulative occupancy rate may be "0.2." The channel occupancy rate of the second base station may be "0.1" and the cumulative occupancy rate may be "0.5." The channel occupancy rate of the third base station may be "0.6" and the cumulative occupancy rate may be "0.3." The resource occupancy rate of the first base station may be determined to "0.1," the resource occupancy rate of the second base station may be determined to "−0.4," and the resource occupancy rate of the third base station may be determined to "0.3." Thereafter, the first base station may identify a first contention slot 1851 which is the 19th slot, as the contention slot for the first operator. In addition, the third base station may identify a third contention slot 1853 which is the 15th slot as the contention slot for the third operator. Likewise, the second base station may determine the 29th slot as the contention slot for the second operator. However, since the number of slots in the contention duration is 20, the second base station may not identify the contention slot in the contention duration.

According to various embodiments of FIG. 18C, the contention slot is selected according to the resource occupancy rate of each operator by considering a target resource occupancy rate, such that utility of each operator can be maximized.

Figure 18D:
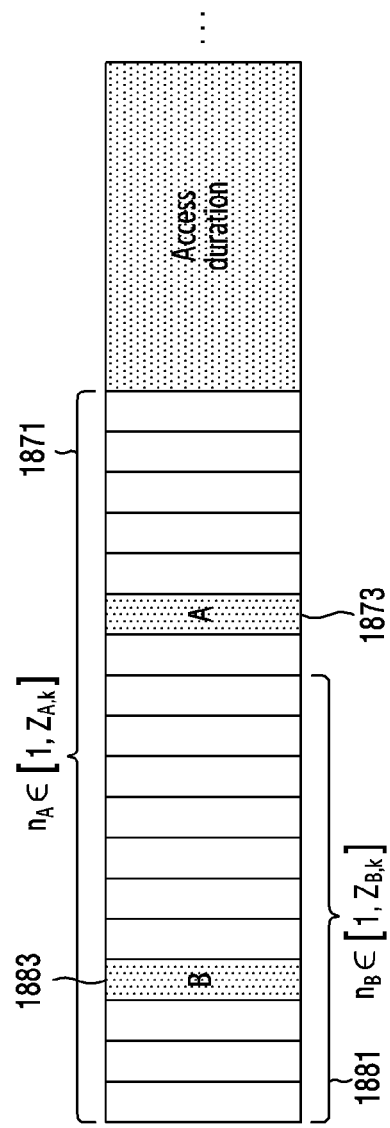
FIG. 18D is a view illustrating yet another example of contention slot selection according to various embodiments of the present disclosure.

FIG. 18D is a view illustrating yet another example of contention slot selection according to various embodiments of the present disclosure. Hereinafter, a situation where a first base station of a first operator A and a second base station of a second operator B select contention slots in a contention range will be described for convenience of explanation.

In the embodiment of FIG. 18D, the contention range of each operator may be determined to maximize a sum utility of all of the operators sharing the band. In some embodiments, the resource occupancy rate of the base station of each operator may be determined according to a utility function and a proportional fairness (PF) algorithm. For example, the resource efficiency of each operator may be determined according to the following equation:

$$\max_{\mu_{A,k},\mu_{B,k}} U(\mu_{A,k},\mu_{B,k}) = \log(R_{A,k}\mu_{A,k}) + \log(R_{B,k}\mu_{B,k}) \quad \text{Equation 7}$$

where $\mu_{A,k}$ is a resource occupancy rate of the first operator in the k-th control period, $\mu_{B,k}$ is a resource occupancy rate of the second operator in the k-th control period, $U(\cdot)$ is a utility function, $R_{A,k}$ is a system efficiency of the first operator in the k-th control period, and $R_{B,k}$ is a system efficiency of the second operator in the k-th control period. The system efficiency of each operator may be a pre-obtained value.

$\mu_{A,k}$ and $\mu_{B,k}$ are required to satisfy the following condition equations:

$$R_{A,k}\mu_{A,k} \leq \gamma_{A,k}, R_{B,k}\mu_{B,k} \leq \gamma_{B,k}, \mu_{A,k}+\mu_{B,k} \leq 1, \text{ and }$$
$$\mu_{A,k},\mu_{B,k} \geq 0 \quad \text{Equation 8}$$

where $\gamma_{A,k}$ is a target rate of the first operator in the k-th control period, and $\gamma_{B,k}$ is a target rate of the second operator in the k-th control period. According to an embodiment, each target rate may be a pre-obtained value (or a given value). The target rate may be determined by the following equation:

$$\gamma_{A,k} = \frac{V_{A,k}}{T_k}, \gamma_{B,k} = \frac{V_{B,k}}{T_k} \quad \text{Equation 9}$$

where $V_{A,k}$ is a traffic load of the first operator in the k-th control period, and $V_{B,k}$ is a traffic load of the second operator in the k-th control period. According to an embodiment, the traffic load may be a pre-obtained value.

The manager device may calculate the resource occupancy rate of each operator to maximize an overall sharing band efficiency. The manager device may determine the contention range of each base station, based on the resource occupancy rate of each base station. For example, the contention range of the first base station and the contention range of the second base station may be determined according to the following equation. Herein, it is assumed that the resource occupancy rate of the second base station is higher than the resource occupancy rate of the first base station.

$$f(\mu_{A,k})=([Z_{A,k}^{start},Z_{i,k}^{end}])=([1,N]) \quad \text{Equation 10}$$

$$f(\mu_{B,k})=([Z_{B,k}^{start},Z_{B,k}^{end}])=([1,2N(1-\mu B,k)-1]) \quad \text{Equation 11}$$

where $\mu_{A,k}$ is a resource occupancy rate of the first operator in the k-th control period, and $\mu_{B,k}$ is a resource occupancy rate of the second operator in the k-th control period. $Z_{A,k}^{start}$ is a start slot of the contention range of the first operator in the k-th control period. $Z_{A,k}^{end}$ is a last slot of the contention range of the first operator in the k-th control period. $Z_{B,k}^{start}$ is a start slot of the contention range of the second operator in the k-th control period. $Z_{B,k}^{end}$ is a last slot of the contention range of the second operator in the k-th control period. N is the number of slots in the contention duration.

The manager device may determine the contention range of each base station, and then may transmit the contention range of each base station to the corresponding base station. Each base station may identify a contention slot in the contention range. According to an embodiment, the manager device may not directly determine the contention range of the base station, and may transmit contention configuration information including the calculated resource occupancy rates to the base stations of the operators. In this case, the base station may determine the contention range of each base station, and may identify the contention slot in the contention range.

Referring to FIG. 18D, a first contention range 1871 of the first operator may be determined by $Z_{A,k}$ number of slots. $Z_{A,k}$ may be the N number of slots corresponding to the length of the contention duration. A second contention range 1881 of the second operator may be determined by $Z_{B,k}$ number of slots. Considering that the resource occupancy rate of the second operator is higher than the resource occupancy rate of the first operator, $Z_{B,k}$ may be smaller than $Z_{A,k}$. The first base station may identify a first contention slot 1873 from the first contention range 1871. The second base station may identify a second contention slot 1883 from the second contention range 1881.

According to embodiments of FIG. 18D, the resource occupancy rate of each operator maximizing a sum utility of all operators in the shared band may be determined. The resource occupancy rate and the contention range are determined based on the proportional fairness algorithm, such that fairness between the operators can be satisfied, and simultaneously, the overall efficiency of the system managing the shared band can be enhanced.

Performance of the Frame-Based Band Sharing Technique

Figure 19A:
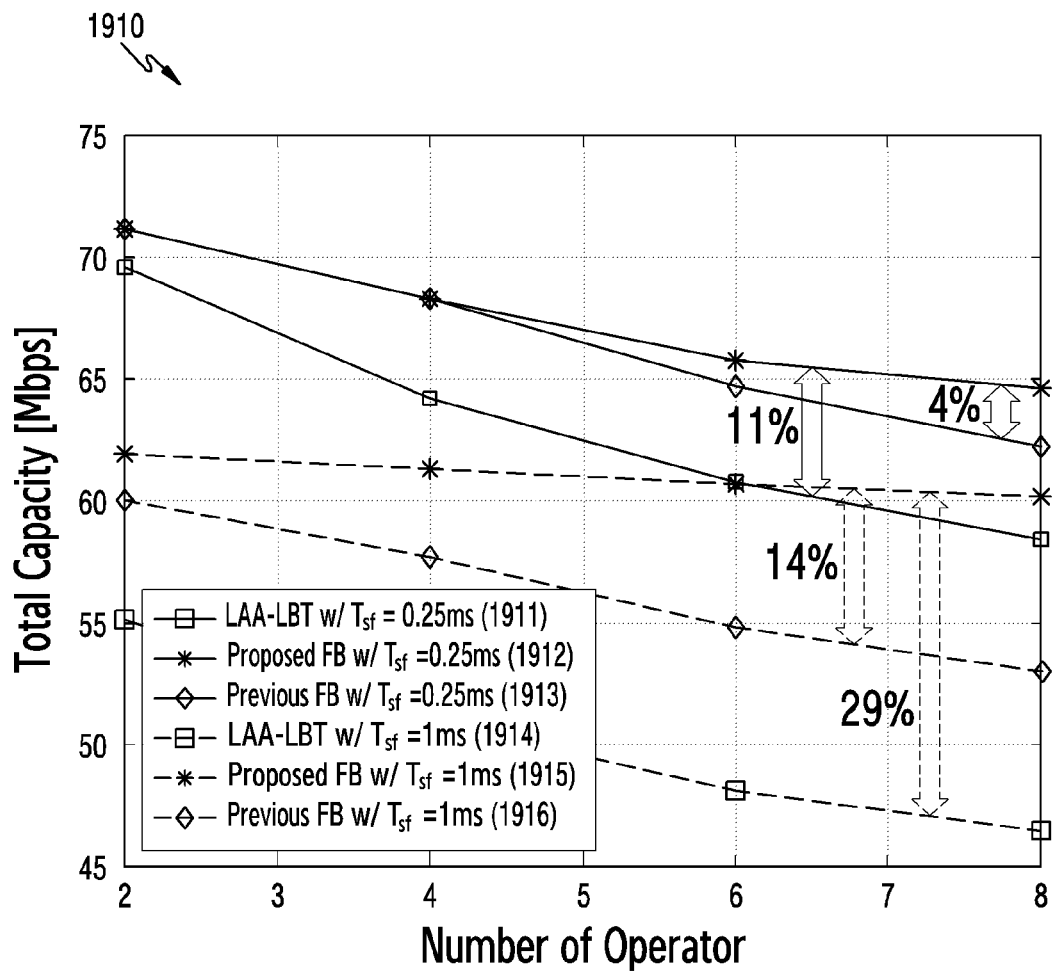
FIG. 19A is a view illustrating a graph showing performance of a frame-based band sharing protocol according to various embodiments of the present disclosure.

FIG. 19A is a view illustrating a graph showing performance of a frame-based band sharing technique according to various embodiments of the present disclosure.

Referring to FIG. 19A, the graph 1910 illustrates total capacity of each of licensed assisted access (LAA)—listen before talk (LBT), a related-art frame-based band sharing technique in which one operator occupies one access duration (hereinafter, referred to as a previous frame-based (FB) method), and the frame-based band sharing technique of the present disclosure in which a plurality of operators share one access duration (hereinafter, a proposed FB method). All of the comparison techniques are to allow a plurality of operators to share one band through occupancy (hereinafter, a band sharing technique). The horizontal axis indicates the number of operators participating in band sharing. The vertical axis indicates total capacity. Herein, the capacity refers to a transmission capacity.

A line 1911 indicates the performance of the LAA-LBT technique when a length of a sub frame in a frame is 0.25 millisecond (ms). A line 1912 indicates the performance of the previous FB method when the length of the sub frame is 0.25 ms. A line 1913 indicates the performance of the proposed FB method when the length of the sub frame in the frame is 0.25 ms. The proposed FB method may provide a channel capacity than the LAA-LBT technique and the previous FB method. In addition, as indicated by the graph 1910, as the number of operators attempting to share the band increases, a performance difference of the proposed FB method from the other band sharing techniques increases. For example, when the number of operators participating in band sharing is 8, the proposed FB method provides a capacity increasing by 11% in comparison to the LAA-LBT technique and increasing by 4% in comparison to the previous FB technique.

As the length of the sub frame increases, the proposed FB method may be more effective in comparison to the other band sharing techniques. A line 1914 indicates the performance of the LAA-LBT technique when the length of the sub frame in the frame is 1 ms. A line 1915 indicates the performance of the previous FB method when the length of the sub frame is 1 ms. A line 1916 indicates the performance of the proposed FB method when the length of the sub frame in the frame is 1 ms. For example, when the number of operators participating in band sharing is 8, the proposed FB method provides a capacity increasing by 29% in comparison to the LAA-LBT technique and increasing by 14% in comparison to the previous FB technique.

Figure 19B:
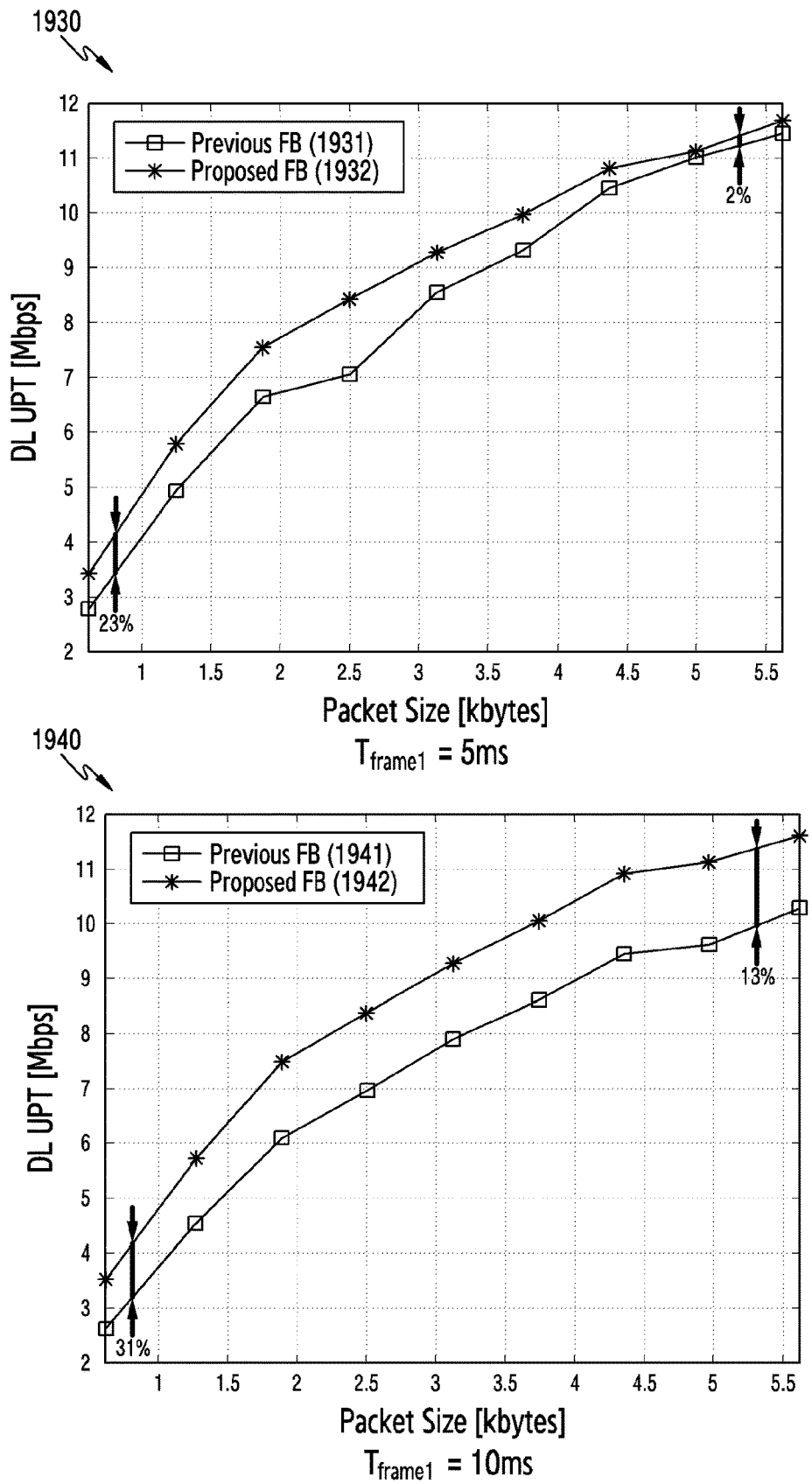
FIG. 19B is a view illustrating another graph showing performance of a frame-based band sharing protocol according to various embodiments of the present disclosure.

FIG. 19B is a view illustrating another graph indicating the performance of the frame-based band sharing technique according to various embodiments of the present disclosure. Each of graphs 1930 and 1940 indicates the performance of the proposed technique when the length of the sub frame is 0.5 ms, a packet arrival time is 20 ms, and two operators participate in band sharing.

Referring to FIG. 19B, the graph 1930 illustrates a user perceived throughput (UPT) in downlink (DL) (hereinafter, referred to as DL UPT) of the previous FB method and the proposed FB method when the length of the frame is 5 ms. The horizontal axis indicates a packet size. The vertical axis indicates DL UPT. A line 1931 indicates the performance of the previous FB method when the length of the frame is 5 ms. A line 1932 indicates the performance of the proposed FB method when the length of the frame is 5 ms. When the packet size is 0.625 kilo-bytes (kbytes) (5-kbit), the proposed FB method provides DL UPT increasing by 23% in comparison to the previous FB technique. When the packet size is 5.625 kbytes (45-kbit), the proposed FB method provides UL UPT increasing by 13% in comparison to the previous FB method.

The graph 1940 illustrate DL UPT of the previous FB method and the proposed FB method when the length of the frame is 10 ms. The horizontal axis indicates a packet size. The vertical axis indicates DL UPT. A line 1941 indicates the performance of the previous FB method when the length of the frame is 10 ms. A line 1942 indicates the performance of the proposed FB method when the length of the frame is 10 ms. When the packet size is 0.625 kbytes, the proposed FB method provides DL UPT increasing by 31% in comparison to the previous FB technique. When the packet size is 5.625 kbytes, the proposed FB method provides DL UPT increasing by 2% in comparison to the previous FB technique.

According to various embodiments as described above through FIG. 19B, an unnecessary procedure (for example, transmission of a reservation signal) for occupying the access duration in the frame is reduced, and the plurality of operators (for example, two operators) have the opportunity to occupy, such that a user throughput can be increased.

Figure 19C:
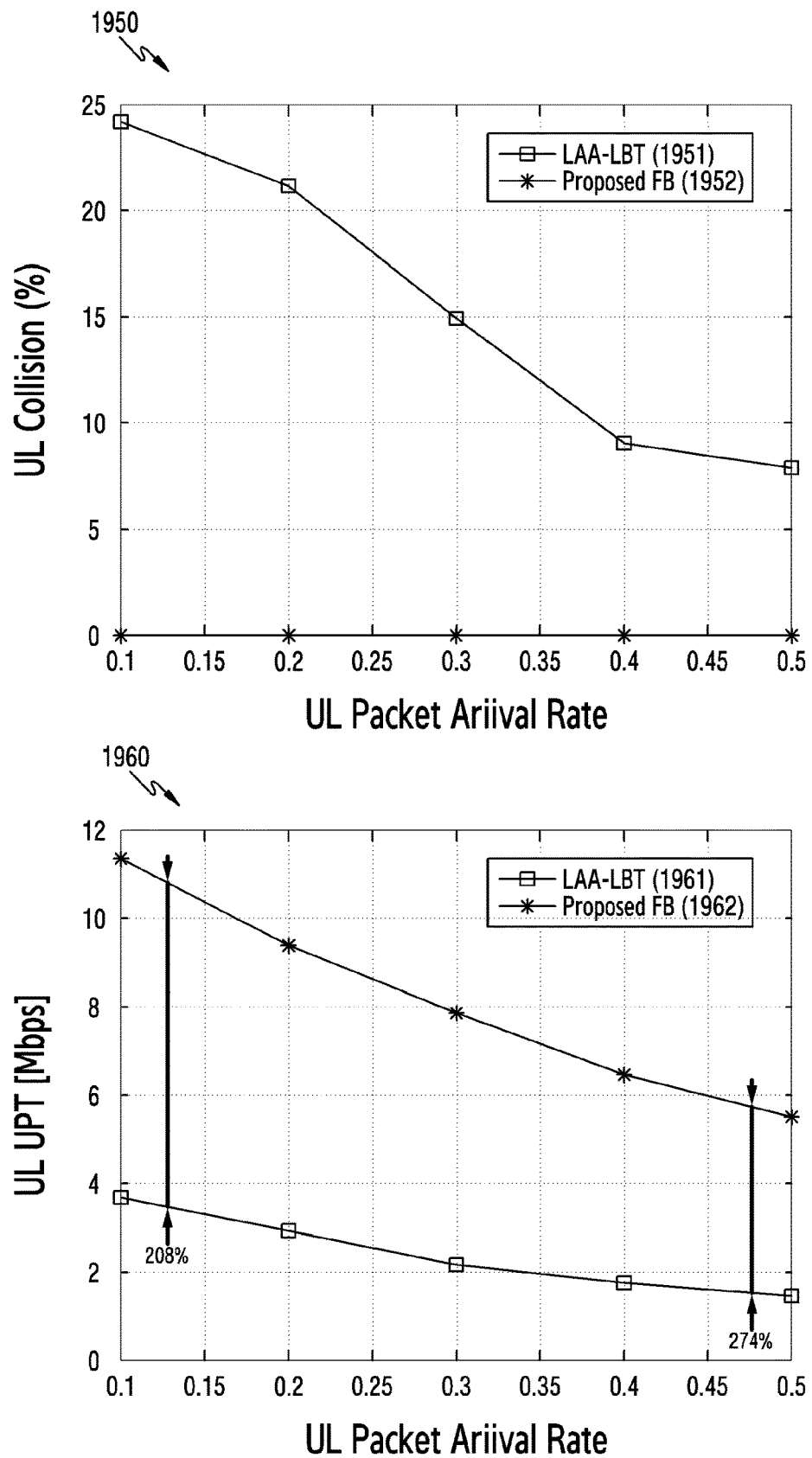
FIG. 19C is a view illustrating still another graph showing performance of a frame-based band sharing protocol according to various embodiments of the present disclosure.

FIG. 19C is a view illustrating still another graph indicating the performance of the frame-based band sharing technique according to various embodiments of the present disclosure. Graphs 1950 and 1960 indicates the performance of the proposed technique when the packet size is 0.5 mega-bytes (Mbytes), the length of the sub frame is 0.5 ms, a ratio of downlink-uplink (uplink)(UL) is 0.5:0.5, and the number of operators participating in band sharing is 2.

Referring to FIG. 19C, the graph 1950 indicates a UL collision rate of each of the previous FB method and the proposed FB method. Herein, the UL collision rate refers to a ratio of an uplink collision by a hidden node, that is, the number of UL sub frames influenced by the hidden node in comparison to the number of transmitted UL sub-frames. The horizontal axis indicates an UL packet arrival rate. The vertical axis indicates a UL collision rate. A line 1951 indicates the performance of the previous FB method. A line 1952 indicates the performance of the proposed FB method. When the UL packet arrival rate is 0.1, the proposed FB method provides a reduced UL collision rate in comparison to the previous FB technique. When the UL packet arrival rate is 0.5, the proposed FB method provides a reduced UL collision rate in comparison to the previous FB technique.

The graph 1960 illustrates UL UPT of each of the previous FB method and the proposed FB method. The horizontal axis indicates a UL packet arrival rate. The vertical axis indicates UL UPT. Herein, UL UPT refers to a packet size in comparison to a packet transmission time. A line 1961 indicates the performance of the previous FB method. A line 1962 indicates the performance of the proposed FB method. When the packet size is 0.1, the proposed FB method provides UL UPT increasing by 208% in comparison to the previous FB method. When the packet size is 0.5, the proposed FB method provides UL UPT increasing by 274% in comparison to the previous FB technique.

As described above through FIG. 19C, according to various embodiments, an inter-user collision in the frame can be reduced, and the plurality of operators (for example, two operators) has the opportunity to occupy, such that a user throughput can be increased.

According to various embodiments as described above, the opportunity to occupy the access duration is provided to the plurality of operators through the contention duration in the frame, such that resource utilization efficiency can be increased. In addition, according to various embodiments, an overhead (for example, an MAC over head such as a reservation signal) caused by a contention can be reduced, and also, a band sharing protocol considering performance dynamics of operators can be performed by defining (configurating) a resource structure according to a resource occupancy rate of each operator, an access probability, etc.

Methods based on the claims or the embodiments disclosed in specification of the present disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in specification of the present disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the present disclosure. In addition, an additional storage device on a communication network may access to a device which performs the embodiments of the present disclosure.

In the above-described specific embodiments of the present disclosure, elements included in the present disclosure are expressed in singular or plural forms according to specific embodiments. However, singular or plural forms are appropriately selected according to suggested situations for convenience of explanation, and the present disclosure is not limited to a single element or plural elements. An element which is expressed in a plural form may be configured in a singular form or an element which is expressed in a singular form may be configured in plural number.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of a base station of a first operator in a wireless communication system, the method comprising:
   receiving duration information, including a contention duration and an access duration, of at least one operator from a management device of the at least one operator;
   receiving contention configuration information used to configure at least one contention parameter of the at least one operator, including information related to a contention metric of the at least one operator from the management device of the at least one operator;
   identifying a first contention range that indicates a range where a first contention slot is positioned in the contention duration, based on the contention configuration information, allocated to the first operator among the at least one operator;
   identifying the first contention slot, based on the contention configuration information, among a plurality of slots in the first contention range, allocated to the first operator among the at least one operator;
   transmitting a first signal during the first contention slot; and
   determining occupancy of a band in the access duration, based on a priority of the first operator,
   wherein the priority is determined according to at least one second signal which is detected before the first contention slot in the first contention range, and
   wherein the contention metric indicates at least one of an access probability and a resource occupancy rate of the first operator regarding the band.

2. The method of claim 1, further comprising determining the priority based on a number of the at least one second signal, and
   wherein the at least one second signal is transmitted by another operator different from the first operator.

3. The method of claim 2, wherein determining the priority comprises:
   when the at least one second signal is not detected, determining the priority to a highest priority; and
   when the number of the at least one second signal is N (N is a positive integer), determining the priority to an N+1-th priority.

4. The method of claim 3, wherein determining the occupancy of the band comprises: when N number of end signals are detected, determining occupancy of the band by the first operator in the access duration, and wherein an end signal indicates that an occupancy of the band by an operator ends.

5. The method of claim 1, wherein the resource occupancy rate is determined based on a size of a traffic load of the base station, a number of operators for sharing the band, and a channel state related to the base station.

6. The method of claim 1,
wherein a length of the contention duration and a length of the access duration are determined based on a number of operators for sharing the band.

7. The method of claim 6, further comprising:
transmitting a first notification signal in a last slot of a contention duration of an initial frame which is before a frame to which the duration information applies; and
transmitting a second notification signal in a last symbol of an access duration of the initial frame.

8. The method of claim 1, further comprising:
transmitting a start signal to a terminal in response to the occupancy of the band being determined; and
transmitting downlink traffic to the terminal in the access duration after transmitting the start signal.

9. The method of claim 1, wherein each of the first signal and the at least one second signal is a reservation signal, and
wherein the band is an unlicensed band.

10. An apparatus in a wireless communication system, the apparatus comprising:
at least one transceiver; and
at least one processor operably coupled to the at least one transceiver and configured to:
receive duration information, including a contention duration and an access duration, of at least one operator from a management device of the at least one operator;
receive contention configuration information used to configure at least one contention parameter of the at least one operator, including information related to a contention metric of the at least one operator from the management device of the at least one operator;
identify a first contention range that indicates a range where a first contention slot is positioned in the contention duration, based on the contention configuration information, allocated to a first operator among the at least one operator;
identify the first contention slot, based on the contention configuration information, among a plurality of slots in the first contention range, allocated to the first operator among the at least one operator;
transmit a first signal during the first contention slot; and
determine occupancy of a band in the access duration, based on a priority of the first operator,
wherein the priority is determined according to at least one second signal which is detected before the first contention slot in the first contention range, and
wherein the contention metric indicates at least one of an access probability and a resource occupancy rate of the first operator regarding the band.

11. The apparatus of claim 10, wherein the at least one processor is further configured to determine the priority based on a number of the at least one second signal, and
wherein the at least one second signal is transmitted by another operator different from the first operator.

12. The apparatus of claim 11, wherein, to determine the priority, the at least one processor is further configured to:
when the at least one second signal is not detected, determine the priority to a highest priority; and
when the number of the at least one second signal is N (N is a positive integer), determine the priority to an N+1-th priority.

13. The apparatus of claim 12, wherein, to determine the occupancy of the band, the at least one processor is further configured to:
when N number of end signals are detected, determine occupancy of the band by the first operator in the access duration, and
wherein an end signal indicates that an occupancy of the band by an operator ends.

14. The apparatus of claim 10, wherein the resource occupancy rate is determined based on a size of a traffic load of a base station, a number of operators for sharing the band, and a channel state related to the base station.

* * * * *